United States Patent [19]

Fukuda et al.

[11] Patent Number: 4,626,826
[45] Date of Patent: Dec. 2, 1986

[54] METHOD AND APPARATUS FOR ENCODING AND DECODING AN NRZI DIGITAL SIGNAL WITH LOW DC COMPONENT AND MINIMUM LOW FREQUENCY COMPONENTS

[75] Inventors: Shinichi Fukuda; Yuichi Kojima, both of Tokyo, Japan

[73] Assignee: Sony Corporation, Tokyo, Japan

[21] Appl. No.: 663,148

[22] Filed: Oct. 22, 1984

[30] Foreign Application Priority Data

Oct. 27, 1983 [JP] Japan .................... 58-201587

[51] Int. Cl.$^4$ .................................... H04L 3/00
[52] U.S. Cl. ........................ 340/347 DD; 358/261; 360/39; 360/40; 375/19
[58] Field of Search ............ 340/347 DD; 360/39-41; 375/19; 358/261

[56] References Cited

U.S. PATENT DOCUMENTS 4,387,364  6/1983  Shirota ................. 340/347 DD
4,499,454  2/1985  Shimada ............... 340/347

FOREIGN PATENT DOCUMENTS 2101854  1/1983  United Kingdom .

*Primary Examiner*—T. J. Sloyan
*Attorney, Agent, or Firm*—Lewis H. Eslinger; Alvin Sinderbrand

[57] ABSTRACT

A converted digital signal is provided in an NRZI (non-return to zero, inverted) code with a zero DC component and with a maximum predetermined number of bits between level transitions in the signal. The base digital signal is divided into m-bit base words, each of which is then converted into an n bit converted code word to form a converted digital signal suitable for recording. The n-bit converted code word is selected from a plurality of primary combinations or code words having a DC component substantially equal to zero when NRZI-coded and a plurality of secondary combinations or code words having a DC component with an absolute value of two when NRZI-coded. A variance of the DSV (digital sum variation) of each primary combination when NRZI-coded and a polarity of the DC component of each secondary combination when NRZI-coded are altered in response to the DSV at the exit of the preceding converted digital signal.

12 Claims, 18 Drawing Figures

F I G. 4A
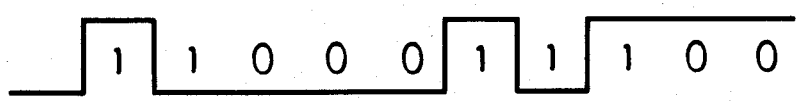
F I G. 4B
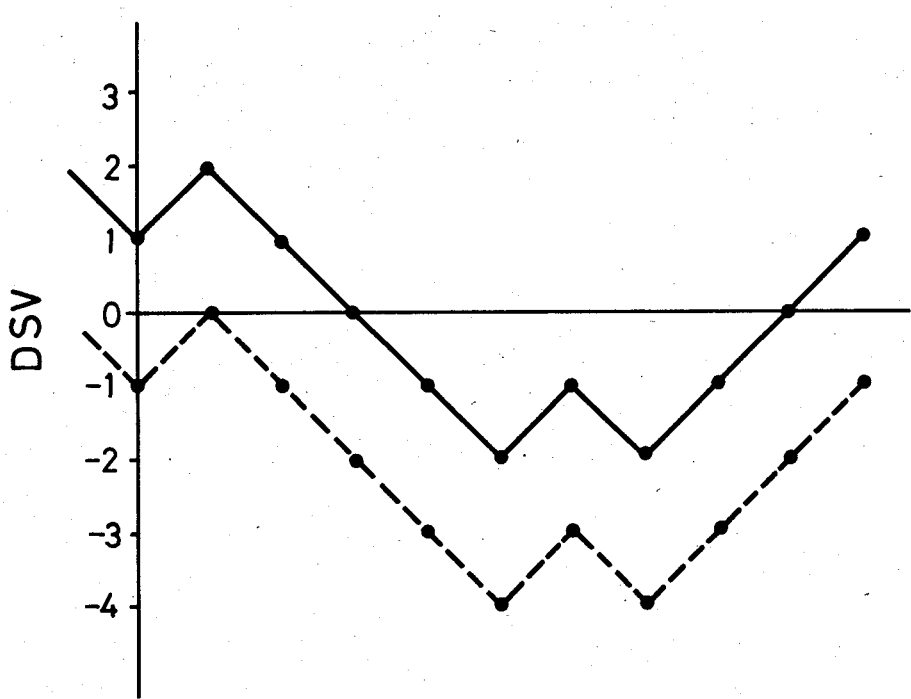

METHOD AND APPARATUS FOR ENCODING AND DECODING AN NRZI DIGITAL SIGNAL WITH LOW DC COMPONENT AND MINIMUM LOW FREQUENCY COMPONENTS

BACKGROUND OF THE INVENTION

1. Field of the Invention

The present invention relates to a digital data converting method and apparatus therefor and, more particularly, to a digital data converting method and apparatus therefor suitable for use when a digital signal is transmitted or recorded.

2. Description of the Prior Art

An apparatus is known in which an analog signal, such as an audio signal or the like, is converted into a digital or PCM (pulse code modulated) audio signal, magnetically recorded in slant tracks on a magnetic tape by using a rotary head and without forming guardbands between the tracks, and then the audio signal is reproduced with high fidelity. In such known apparatus, during reproducing in addition to a differentiated output characteristic of the magnetic recording and a low frequency crosstalk component generated from adjacent tracks, a low frequency component of the reproduced signal is cut off by a rotary transformer used for transmitting signals to and from the rotary heads so that the low frequency component of the audio signal can not be reproduced with fidelity.

Accordingly, in the above apparatus which prefers a narrow record and playback frequency band and a small low frequency component, it is effective to modulate a record signal into the area of the low frequency component and DC component by a modulating system or format having a concentrated frequency spectrum. A modulation system or format generally called an NRZI (non-return to zero, inverted) is exemplified as one of such modulation systems. In the NRZI format, a binary "1" in the data signal, is represented by a transition of either positive or negative polarity, and a binary "0" is represented by the absence of a transition.

However, in the NRZI system, when consecutive digital zeroes appear, the modulated signal is not inverted, that is, there is no transition during that period and the frequency of the modulated signal becomes low with the result that the DC component or NRZI disparity and the low frequency component are increased.

Therefore, it is proposed to divide the PCM digital information into words comprised of a desired number of bits and to convert such information words into respective code words containing a larger number of bits and which are selected to avoid the occurrence of a large number of consecutive digital zeroes.

The present applicant has previously proposed such an information converting system as follows. This system employs a 8/10 converting scheme in which each eight bit word of digital information in a base digital is converted to a ten-bit word to form a converted digital signal. Eight bits ($B_1$, $B_2$, $B_3$, $B_4$, $B_5$, $B_6$, $B_7$, $B_8$) can be combined in 256 ($2^8$) different ways, that is, can form 256 different 8-bit words. With ten bits, 1024 different 10-bits words or combinations are possible. Thus, 256 of the 1024 possible ten-bit combinations or words are used to represent respective eight-bit combinations or words.

In accordance with the conditions set forth above, there are certain constraints on which of the 256 ten-bit combinations or words can be used to represent respective eight-bit words. First, those conditions require that the DC component of the converted digital signal be zero. Second, because NRZI coding is being used, the number of consecutive digital zeroes in the converted digital signal must never exceed three, otherwise $T_{max}/T_{min}$ (where $T_{max}$ is the maximum interval between level transitions and $T_{min}$ is minimum interval between transitions) will be greater than four.

The following table I shows the number of possible combinations of ten digital bits in NRZI code for which the DC component or disparity is zero, but in which there are not more than three digital zeroes in a row (either internally of each ten-bit word or at the juncture between two such words):

TABLE I

|  | ...1 | ...10 | ...100 | ...1000 |
|---|---|---|---|---|
| 1... | 69 | 34 | 14 | 4 |
| 01... | 40 | 20 | 8 | 1 |
| 001... | 20 | 10 | 3 | 1 |
| 0001... | 8 | 3 | 2 | 1 |

Table I shows that there are numerous possible combinations that will satisfy the constraints. For example, if up to three digital zeroes are permitted at the beginning of each word, then no digital zeroes can be permitted at the end of any word, and in that case, Table I shows that the total of the possible combinations is:

$$137 = 69 + 40 + 20 + 8$$

From all of the possible combinations in Table I, the maximum number of possible combinations having zero disparity is achieved if no more than two digital zeroes are permitted at the beginning of a ten-bit converted word and no more than one digital zero is permitted at the end. In that case, the total is:

$$193 = 69 + 40 + 20 + 34 + 20 + 10$$

Thus, 193 ten-bit combinations are available for which the DC component or disparity is zero. These are hereinafter called "primary combinations."

Since there are 256 possible eight-bit words of original or base data, 63 additional ten-bit combinations or code words are required to represent all of the possible eight-bit words of original data. Thus, it is necessary to use ten-bit combinations for which the DC component or NRZI disparity is not zero.

The following table illustrates the number of possible ten-bit combinations, which begin with no more than two digital zeroes and end with no more than one digital zero, and for which the disparity or DC component is 0, −2 and +2 when NRZI-coded.

TABLE II

| first bit | DC −2 | | DC 0 | | DC +2 | |
|---|---|---|---|---|---|---|
| 1... 11... | 52 | 40 | 103 | 60 | 100 | 43 |
| 101 | | 11 | | 30 | | 30 |
| 100 | | 1 | | 13 | | 27 |
| 01... | | 43 | | 60 | | 40 |
| 001... | | 30 | | 30 | | 11 |

From Table II, it is clear that the number of possible combinations or ten-bit code words for which the DC component or disparity is −2 is expressed as $$52 + 43 + 30 = 125$$

Also it is made clear that the number of possible combinations with a DC component or disparity of +2 is expressed as $$100+40+11=151$$

To calculate the DC components or NRZI disparity for Table II, it was assumed that the exit polarity of the preceding code word or combination was negative or at low level, as shown in FIGS. 2A and 2B. If Table II were constructed by assuming that the exit polarity of the preceding code word was positive or high, then the "−2" and "+2" columns of Table II would be interchanged, as will be apparent from FIGS. 2A and 2B.

Further, the low frequency spectrum of the modulation wave tends to be decreased if code words or combinations with +2 and −2 DC components or disparities are used alternately more frequently than the code words or combinations with a zero DC component or disparity. Accordingly, 125 ten-bit combinations or code words paired to have +2 and −2 DC components or disparities, respectively, are used along with 131 combinations or code words with a zero DC component or disparity to represent the 256 combinations or information of 8 bits.

The paired combinations or code words with +2 and −2 DC components or disparities may be selected such that the DC component or disparity can be controlled only by changing or inverting the first bit of the respective code word. Therefore, of the possible combinations or code words on, for example, Table II, the combinations with +2 and −2 DC charges components or disparities and the first bit "0" number $$40+11+43+30=124$$

It is possible that those 124 combinations or code words and and a suitable number of the combinations or codes words with a zero DC charge, component or disparity in this case, 132 combinations are made corresponding to correspond one by one to 256 combinations or information words, of 8 bits. Then, each time a combination or code word with a ±2 DC component appears, the first bit of that code word is converted in such a manner that the DC components or disparities become positive and negative alternately.

For example as shown in FIGS. 3A and 3B, when a code word or combination with DC component or disparity of ±2 appears, the number of level transitions P (the number of digital "1") from the second bit is counted until the next combination or code word with ±2 DC component or disparity appears. Of the number of level transitions is even, the first bit (shown by an inverted delta or arrow) is converted to digital "1" as shown at the arrow in FIG. 3A, whereas if the number of level transitions is odd, the first bit of the next code word with ±2 disparity remains digital "0" as shown in FIG. 3B.

Thus, even if ±2 DC components appear, they are cancelled out by ±2 DC components of the succeeding combinations and hence regardless of any consecutive digital components, the overall DC component of the coded digital signal becomes zero.

By the way, the integral of the NRZI wave is generally called the DSV (digital sum variation) which is employed in one of the evaluation methods. Let it be considered that a code word or combination is formed of a 10-bit pattern. If the accumulation or summation of the disparities of the preceding code words has the value 1, that is, when the zero DC component or disparity as, for example, shown in FIG. 4A. When transition from the preceding code word begins with DSV=1, the DSV of the code word represented in FIG. 4A is that shown by a solid line in FIG. 4B.

If the width between the maximum and minimum values of the DSV is small, the DSV has small DC component block and the low frequency component is reduced. As one of the evaluation methods, it is known to use a parameter which is generally referred to as DSV variance. This DSV variance can be obtained by squaring and averaging DSV values of all bits and it is desired that this DSV variance be as small as possible. While the level of DSV=0 is defined as an average value of the DSV values all bits have, the DSV level for the waveform of the word which was NRZI-coded is defined as DSV max=−DSV min. Accordingly, in this case, it is convenient that the DSV at the boundary between the successive words is ±1 or −1 and the intermediate value between DSV max and DSV min is defined as DSV=0.

Therefore, let us consider the above converting method using the evaluation method of DSV variance. In the combination or code word as, for example, shown in FIG. 4A, when the evaluation of DSV variance begins with DSV=+1, the DSV changes along the solid line shown in FIG. 4B as described above and DSV variance at that time becomes 1.7. On the other hand when the evaluation of DSV variance begins with DSV=−1, the DSV changes as shown by a broken line in FIG. 4B and DSV variance at that time becomes 6.9. In other words, combinations or code words having the same bit pattern are made to have different DC characteristics depending on the initial setting of the DSV. Particularly, in this case when the evaluation of DSV variance begins with DSV=−1, the DSV variance becomes large, which is not desired.

FIG. 5 shows an example of an apparatus which is capable of eight-bit to ten-bit conversion in accordance with the above converting system. In FIG. 5, reference numeral 1 is an input terminal, 2 is an 8-bit shift register which accepts eight-bit information of 8 bits, 3 a conversion logic circuit which uses, for example, a programmable logic array (PLA), and 4 is a clock terminal. The information applied to the input terminal 1 is transferred 8 bits by 8 bits through the shift register 2 in response to a pulse which is applied to the clock terminal 4 at the data bit rate and the information words of 8 bits ($B_1$, $B_2$, $B_3$, $B_4$, $B_5$, $B_6$, $B_7$, $B_8$) are supplied to the conversion logic circuit 3.

Reference numeral 5 designates a data sync (synchronizing) pattern selecting circuit which is controlled for selection operation on the basis of a data/sync selection control signal applied to a terminal 6. When the movable contacts of this selecting circuit 5 are positioned to engage contacts a, a code word of 10 bits ($P_1$, $P_2$, $P_3$, $P_4$, $P_5$, $P_6$, $P_7$, $P_8$, $P_9$, $P_{10}$) which was generated in the above one-to-one conversion in the conversion logic circuit 3 is supplied to a 10-bit shift register 7. On the other hand, when the movable contacts of this selecting circuit 5 are changed in position to engage contacts b, the sync pattern which is always applied to contacts b is delivered from this selecting circuit 5. As this sync pattern, there is used a sync pattern of 10 bits which does not appear in this converting system, that is, does not correspond to any 10-bit code word.

Reference numeral 8 designates a detecting circuit which detects whether the first bit is made variable or fixed, namely that is, whether the combination has a zero DC component or a ±2 DC component. For example, this detecting circuit 8 may carry out modulo-addition for even-numbered bits of the outputs of the selecting circuit 5, or may detect whether the number of digital zeroes of the even-numbered bits is even or odd. When the detected number is zero (even), the detecting circuit 8 perceives therefrom that the combination has a ±2 DC component and, accordingly, detecting circuit 8 produces at its output a high level or digital "1". The output of detecting circuit 8 is supplied to one inut terminal of an AND circuit 9 and the AND circuit 9 is supplied at the other input terminal with an output from a detecting circuit 10 which is connected to the output of the shift register 7 for detecting DSV of each 10-bit code word or combination. This detecting circuit 10 supplies a high level or digital "1" output to the respective input of AND circuit 9 when the DSV at the exit of the preceding combination or code word is, for example, −1.

The output of the AND circuit 9 is supplied to one input terminal of an exclusive-OR (hereinafter simply referred to as EOR) circuit 11. To the other input terminal of this EOR circuit 11 is supplied a first bit $P_1$ of the 10 bits from the selecting circuit 5. Accordingly, when the output of the AND circuit 9 is "0", the first bit $P_1$ is not inverted in being fed to the shift register 7. However, when the output of the AND circuit 9 is "1", the first bit $P_1$ is inverted in polarity in being fed through EOR 11 to the shift register 7.

As to the combination of a code word or combination with zero DC component or disparity and a code word or combination with ±2 DC component or disparity, the conversion logic circuit 3 is adapted to produce any one of such disparities. In this connection, when the conversion logic circuit 3 produces a converted code word or combination which has −2 DC component or disparity and the evaluation of DSV variance begins with −1, that is, DSV = −1 at the exit of the preceding code word, the first bit of the code word from circuit 3 is inverted in level by the EOR circuit 11 (at this time, the output of the AND circuit 9 is at a high level) and then is produced a code word or combination having +2 DC component or disparity. Since the output of the detecting circuit 8 is at a low level and the output of the AND circuit 9 is at a low level for a code word or combination with a zero DC component, such code word is directly transmitted to register 7 without its first bit being inverted in level by the EOR circuit 11.

Further, a timing detecting circuit 12 detects the timing of the pulse which is applied to the clock terminal 1 at the data bit rate and the timing signal from the timing detecting circuit 12 is supplied to a load terminal LD of the shift register 7 at every 8 bits of data.

As described above, the content or data converted to the form of 10 bit data and latched in the shift register 7 is sequentially read out therefrom on the basis of a clock signal with a frequency 5/4 times the clock frequency of the input signal and supplied to shift register 7 from a clock terminal 13. The signal thus read out is supplied to, for example, a T-type flip-flop circuit 14 serving as an NRZI-coding circuit, and on the basis of the clock signal applied from the clock terminal 13 to the clock terminal of this flip-flop circuit 14, the flip-flop circuit 14 produces an NRZI coded signal at an output terminal 15.

FIG. 6 schematically shows an example of an apparatus for demodulating the information which was modulated by the apparatus of FIG. 5 in accordance with the above described method.

In FIG. 6, reference numeral 21 designates an input terminal to which a signal is supplied through an NRZI demodulating circuit 22, whereupon, the resulting 10-bit demodulated code word is applied to a 10-bit shift register 23. The code word of ten bits is transferred throughout the 10-bit shift register 23 on the basis at a pulse of the code bit rate supplied thereto from a clock terminal 24. Each code word of ten bits, $P_1$ to $P_{10}$ from the shift register 23 is supplied to a conversion logic circuit 25 which uses, for example, a PLA (programmable logic array).

Also connected to the output of the demodulating circuit 22 is a detecting circuit 26 which detects the DSV of each code word or combination, and the output of this detecting circuit 26 is supplied to one input terminal of an EOR circuit 27. To the other input terminal of the EOR circuit 27 is supplied the first bit $P_1$ of the output from the shift register 23. In this case, the input to the conversion logic circuit 25 is either a code word or combination with a zero DC component or disparity or a code word or combination which ±2 DC component or disparity. The detecting circuit 26 produces a high level or logic "1" output when the DSV at the exit of the preceding code word or combination is =1. Accordingly, when supplied with a combination with a +2 DC component or disparity from the shift register 23, the EOR circuit 27 inverts its first bit $P_1$ and passes the same to circuit 25, while when supplied with a combination with a −2 DC component from the shift register 23, the EOR circuit 27 passes on the first bit as it is.

In the conversion logic circuit 25, the code word of ten bits, $P_1$ to $P_{10}$ is demodulated using one-to-one reverse conversion. Accordingly, the demodulated information word of eight bits, $B_1$ to $B_8$ is delivered to an 8-bit shift register 28 and then latched therein each time a timing signal (a pulse of each block), which results from detecting by a timing detecting circuit 30, and is applied to a load terminal LD of the shift register 28. Then, the content or data of the shift register 28 is shifted bit by bit on the basis of the pulse which is applied from a terminal 29 to its clock terminal at a data bit rate thereby to provide the information data at an output terminal 31.

As described above, the modulation and demodulation of information can be carried out.

By the way, in the case of the circuit arrangement in which a PLA is used for the conversion logic circuit 3 or 25 as described above, a circuit for detecting whether the combination has a zero DC component or ±2 DC components or the like is required so that the circuit arrangement becomes complicated. This poses no problem when a ROM (read-only memory) is used as the conversion logic circuit 3 or 25. However, the use of a ROM causes the circuit arrangement to become large, and when this ROM is formed as an IC (integrated circuit), the ROM occupies a large area and consumes much power.

Further, if the paired combinations or code words are not limited to code words in which bits from the second bits on are equal but are selected from code words having small DSV variance, although the DSV variance can be made smaller, it is unavoidable that the circuit arrangement becomes even more complex.

Furthermore, an 8-bit to 9-bit conversion NRZI-coding system is disclosed in the Published British Patent Application No. 2101854 the applicant of which is same as the assignee of this application. In such NRZI-coding system, the maximum interval (T max) between level transitions exceeds 14 bit cells, the DC components or disparities of modulated words are as large as +4 or −9 and further DSV variance is large.

OBJECTS AND SUMMARY OF THE INVENTION

It is an object of the present invention to provide an improved digital data converting method and apparatus therefor.

It is another object of the present invention to provide a method and apparatus for converting a base digital signal into an NRZI (non-return to zero, inverted)-coded signal having a DC component substantially equal to zero with a minimum of low frequency components.

It is a further object of the present invention to provide a method and apparatus for converting a base digital signal into an NRZI-coded signal having a DC component substantially equal to zero with a decreased variance of digital sum variation (DSV).

In accordance with one aspect of the present invention, a converted digital signal is provided in an NRZI (non-return to zero, inverted) code with a DC component of zero and with a maximum predetermined number of bits between level transitions in the signal. The base digital signal is divided into m-bit base words, each of which is then converted into an n bit converted code word to form a converted digital signal suitable for recording. Each n-bit converted code word is selected from a plurality of primary combinations or code words having a DC component or disparity substantially equal to zero when NRZI-coded and a plurality of secondary combinations each having a DC component or disparity with an absolute value of two when NRZI-coded. A variance of the DSV of the primary combination or code word when NRZI-coded and a polarity of the DC component or disparity of the secondary combination or code word when NRZI-coded are altered in response to the DSV at the exit from the preceding converted digital signal.

The above, and other objects, features and advantages of the present invention, will become apparent from the following description taken in conjunction with the accompanying drawings through which the like references designate the same elements and parts.

BRIEF DESCRIPTION OF THE DRAWINGS

Figures 3A, 3B:
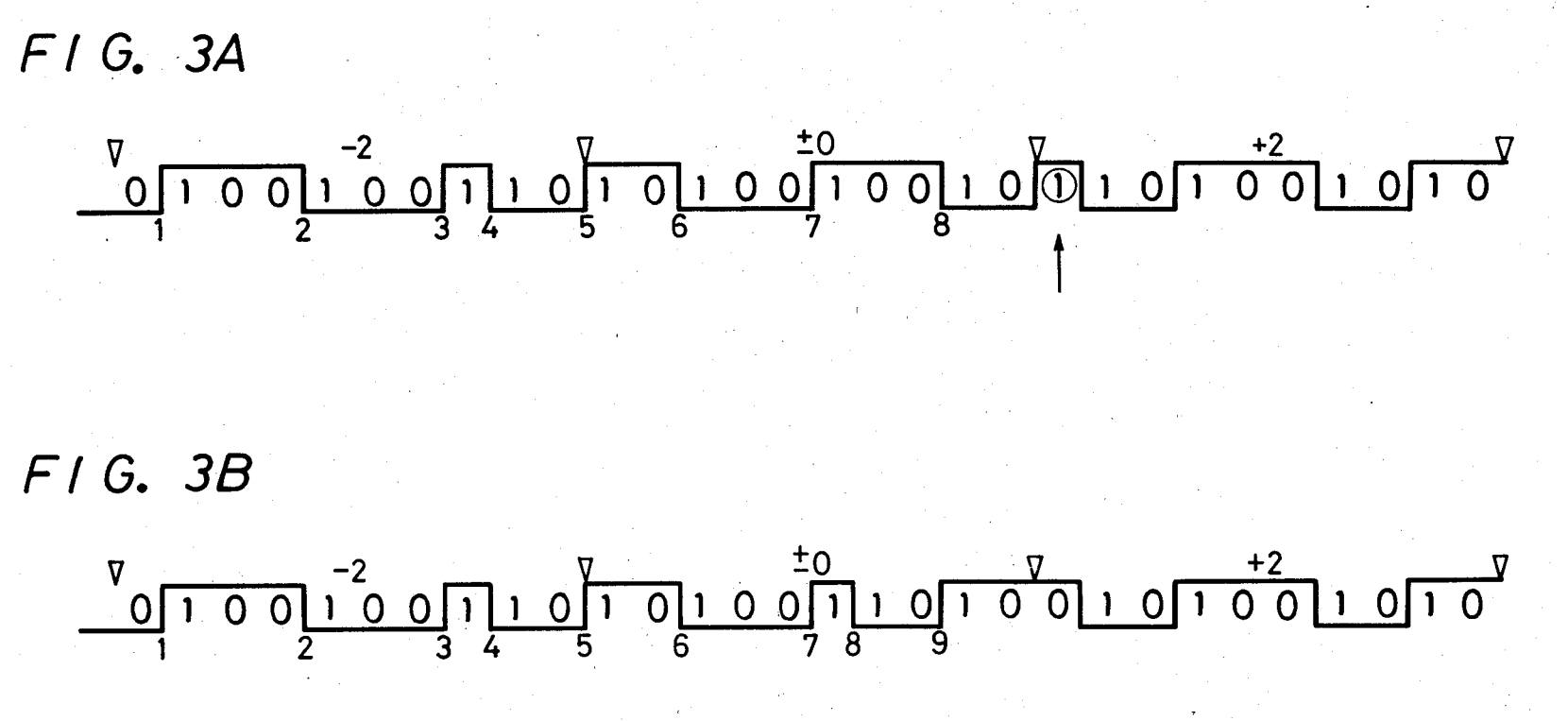

FIGS. 3A and 3B respectively illustrate converted digital signals which are NRZI-coded;

FIG. 4A illustrates a ten-bit word of a converted digital signal which is NRZI-coded;

FIG. 4B illustrates the variance of DSV (digital sum variation) of the ten-bit combination code word shown in FIG. 4A;

DESCRIPTION OF THE PREFERRED EMBODIMENT

Figure 1A:
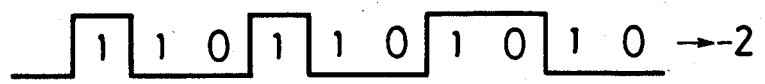
FIGS. 1A to 1C respectively illustrate possible ten-bit words of a converted digital signal which is NRZI (non-return to zero, inverted)-coded.
Figure 1B:
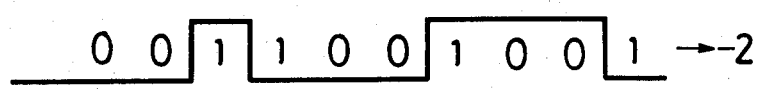
Figure 1C:
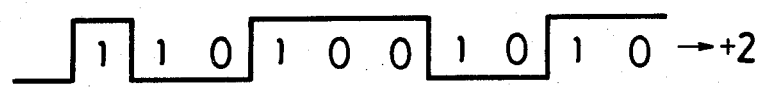
Figure 2A:
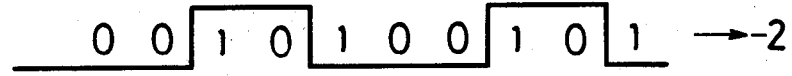
FIG. 2A illustrates a ten-bit word of a converted digital signal which is NRZI-coded.
Figure 2B:
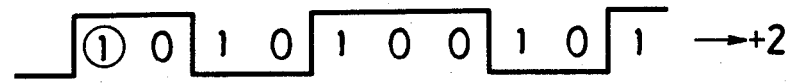
FIG. 2B illustrates the ten-bit combination code word shown in FIG. 2A with the first bit thereof inverted from a digital zero to a digital one; and showing the NRZI waveform that results therefrom.

Now, an embodiment of this invention will hereinafter be described in detail with reference to FIG. 7 to FIG. 11. In this embodiment, 8-bit data is converted to 10-bit data, similarly to the afore-mentioned prior art example.

In accordance with this invention, when using a combination or code word with zero disparity or DC component, the beginning bit thereof is converted similarly to when the combination or code word has a disparity or DC component of +2. To this end, even when the beginning bit is inverted, possible combinations or code words must be formed in $2 \times 2^m$ different ways, or the 8/10 conversion scheme must have $2 \times 256$ possible combinations. It is therefore assumed that $T\max = 5T'(T' = T\min = Tw$ (window margin of detecting window)). Then, the number of the usable combinations is 512 or more.

The following Table III shows the number of possible combinations of 10-bit data which can satisfy the condition of $T\max = 5T'$. In this case, to satisfy $T\max = 5T'$, in NRZI code, consecutive digital zeroes must never exceed four, or the digital signal, after being modulated, must no more than 5 consecutive bits at the same level. Therefore, each code word must begin with at most two digital zeroes and also end with at most two digital zeroes.

TABLE III

| first bit | | DC −2 | | 0 | | +2 | |
|---|---|---|---|---|---|---|---|
| 1... | 11... | 71 | 51 | 120 | 68 | 120 | 52 |
| | 101... | | 17 | | 34 | | 34 |
| | 1001... | | 3 | | 18 | | 34 |
| 0... | 01... | 86 | 52 | 102 | 68 | 68 | 51 |
| | 001... | | 34 | | 34 | | 17 |

In Table III, in the case of a code word beginning with "100 . . . ", if the first bit thereof is inverted, the word becomes "000 . . . ", so that three consecutive digital zeroes are permitted at the beginning thereof. There is then a fear that four or more consecutive digital zeroes will occur at the boundary between the consecutive combinations or code words, with the result that such combinations cannot be used in the converting method according to this embodiment. As a result, if the 55 (3+18+34) combinations beginning "100 . . . " are removed from all the possible combinations on Table III, 512 combinations remain, which number is just twice the number of possible combinations of $2^8=256$.

Accordingly, 256 possible code words or combinations, each of which forms a pair with a code word having a different first bit, can be made to correspond to 256 possible combinations or information words of 8 bit data. In this connection, Table III shows 102 possible code words or combinations (hereinafter referred to as primary combination) each of which forms a pair with a code word having a zero DC component or disparity and a different first bit, and 154 possible combinations (hereinafter referred to as secondary combinations) each of which forms a pair with a code word having $\pm 2$ DC component or disparity and a different first bit.

Upon conversion, when a pair of combinations or code words are converted with either DSV=+1 or −1, the selection of one or the other of such code words is made on the basis of whether the evaluation of DSV variance becomes small. As described above in connection with FIG. 4, when the DC component or disparity is −2, the evaluation of DSV variance begins with DSV=+1, while when the DC component is +2, the evaluation of DSV variance begins with DSV=−1.

The following Table IV shows examples of 256 pairs of possible combinations (code words) which are selected on the basis of Table III, in which they are not corresponded to the data. Table IV shows that one or the other of a pair of two combinations or code words should be selected only by controlling, for example, the first bit. On Table IV, reference Q' designates the DC component or disparity of the code (combination) before being converted, DV designates the variance of DSV, P designates the number of level transitions (even number is 0 and odd number is 1) in each code and Q designates the DC component or disparity information (corresponding to the DSV of the code after just being converted).

TABLE IV

| No. | Q' = −1 CODE | DC | DSV | DV | P | Q | Q' = 1 CODE | DC | DSV | DV | P | Q |
|---|---|---|---|---|---|---|---|---|---|---|---|---|
| 1 | 1100100010 | 0 | 3 | 21 | 0 | −1 | 0100100010 | 0 | 3 | 21 | 1 | −1 |
| 2 | 1101110111 | 0 | 2 | 13 | 0 | −1 | 0101110111 | 0 | 2 | 13 | 1 | −1 |
| 3 | 1101110010 | 0 | 2 | 13 | 0 | −1 | 0101110010 | 0 | 2 | 13 | 1 | −1 |
| 4 | 1101010101 | 0 | 2 | 13 | 0 | −1 | 0101010101 | 0 | 2 | 13 | 1 | −1 |
| 5 | 1101011101 | 0 | 2 | 13 | 1 | 1 | 0101011101 | 0 | 2 | 13 | 0 | 1 |
| 6 | 1101011111 | 0 | 2 | 9 | 0 | −1 | 0101011111 | 0 | 2 | 9 | 1 | −1 |
| 7 | 1101011010 | 0 | 2 | 9 | 0 | −1 | 0101011010 | 0 | 2 | 9 | 1 | −1 |
| 8 | 1101001001 | 0 | 2 | 13 | 1 | 1 | 0101001001 | 0 | 2 | 13 | 0 | 1 |
| 9 | 1101001011 | 0 | 2 | 9 | 0 | −1 | 0101001011 | 0 | 2 | 9 | 1 | −1 |
| 10 | 1101001110 | 0 | 2 | 9 | 0 | −1 | 0101001110 | 0 | 2 | 9 | 1 | −1 |
| 11 | 1101000100 | 0 | 2 | 13 | 0 | −1 | 0101000100 | 0 | 2 | 13 | 1 | −1 |
| 12 | 1111011101 | 0 | 2 | 13 | 0 | −1 | 0111011101 | 0 | 2 | 13 | 1 | −1 |
| 13 | 1111010101 | 0 | 2 | 13 | 1 | 1 | 0111010101 | 0 | 2 | 13 | 0 | 1 |
| 14 | 1111010111 | 0 | 2 | 9 | 0 | −1 | 0111010111 | 0 | 2 | 9 | 1 | −1 |
| 15 | 1111010010 | 0 | 2 | 9 | 0 | −1 | 0111010010 | 0 | 2 | 9 | 1 | −1 |
| 16 | 1111110111 | 0 | 2 | 13 | 1 | 1 | 0111110111 | 0 | 2 | 13 | 0 | 1 |
| 17 | 1111110101 | 0 | 2 | 9 | 0 | −1 | 0111110101 | 0 | 2 | 9 | 1 | −1 |
| 18 | 1111111101 | 0 | 2 | 9 | 1 | 1 | 0111111101 | 0 | 2 | 9 | 0 | 1 |
| 19 | 1111111111 | 0 | 1 | 5 | 0 | −1 | 0111111111 | 0 | 1 | 5 | 1 | −1 |
| 20 | 1111111010 | 0 | 1 | 5 | 0 | −1 | 0111111010 | 0 | 1 | 5 | 1 | −1 |
| 21 | 1111101001 | 0 | 2 | 9 | 1 | 1 | 0111101001 | 0 | 2 | 9 | 0 | 1 |
| 22 | 1111101011 | 0 | 1 | 5 | 0 | −1 | 0111101011 | 0 | 1 | 5 | 1 | −1 |
| 23 | 1111101110 | 0 | 1 | 5 | 0 | −1 | 0111101110 | 0 | 1 | 5 | 1 | −1 |
| 24 | 1111100100 | 0 | 2 | 9 | 0 | −1 | 0111100100 | 0 | 2 | 9 | 1 | −1 |
| 25 | 1110100010 | 0 | 3 | 21 | 1 | 1 | 0110100010 | 0 | 3 | 21 | 0 | 1 |
| 26 | 1110100111 | 0 | 2 | 13 | 1 | 1 | 0110100111 | 0 | 2 | 13 | 0 | 1 |
| 27 | 1110100101 | 0 | 2 | 9 | 0 | −1 | 0110100101 | 0 | 2 | 9 | 1 | −1 |
| 28 | 1110101101 | 0 | 2 | 9 | 1 | 1 | 0110101101 | 0 | 2 | 9 | 0 | 1 |
| 29 | 1110101111 | 0 | 1 | 5 | 0 | −1 | 0110101111 | 0 | 1 | 5 | 1 | −1 |
| 30 | 1110101010 | 0 | 1 | 5 | 0 | −1 | 0110101010 | 0 | 1 | 5 | 1 | −1 |
| 31 | 1110111001 | 0 | 2 | 9 | 1 | 1 | 0110111001 | 0 | 2 | 9 | 0 | 1 |
| 32 | 1110111011 | 0 | 1 | 5 | 0 | −1 | 0110111011 | 0 | 1 | 5 | 1 | −1 |
| 33 | 1110111110 | 0 | 1 | 5 | 0 | −1 | 0110111110 | 0 | 1 | 5 | 1 | −1 |
| 34 | 1110110100 | 0 | 2 | 9 | 0 | −1 | 0110110100 | 0 | 2 | 9 | 1 | −1 |
| 35 | 1110010001 | 0 | 2 | 13 | 1 | 1 | 0110010001 | 0 | 2 | 13 | 0 | 1 |
| 36 | 1110010011 | 0 | 2 | 9 | 0 | −1 | 0110010011 | 0 | 2 | 9 | 1 | −1 |
| 37 | 1110010110 | 0 | 2 | 9 | 0 | −1 | 0110010110 | 0 | 2 | 9 | 1 | −1 |
| 38 | 1110011100 | 0 | 2 | 13 | 0 | −1 | 0110011100 | 0 | 2 | 13 | 1 | −1 |
| 39 | 0100011100 | 0 | 2 | 17 | 0 | −1 | 1100011100 | 0 | 2 | 17 | 1 | −1 |
| 40 | 0100010110 | 0 | 2 | 13 | 0 | −1 | 1100010110 | 0 | 2 | 13 | 1 | −1 |
| 41 | 0100010011 | 0 | 2 | 13 | 0 | −1 | 1100010011 | 0 | 2 | 13 | 1 | −1 |
| 42 | 0100010001 | 0 | 2 | 17 | 1 | 1 | 1100010001 | 0 | 2 | 17 | 0 | 1 |
| 43 | 0100110100 | 0 | 2 | 13 | 0 | −1 | 1100110100 | 0 | 2 | 13 | 1 | −1 |
| 44 | 0100111110 | 0 | 2 | 9 | 0 | −1 | 1100111110 | 0 | 2 | 9 | 1 | −1 |
| 45 | 0100111011 | 0 | 2 | 9 | 0 | −1 | 1100111011 | 0 | 2 | 9 | 1 | −1 |
| 46 | 0100111001 | 0 | 2 | 13 | 1 | 1 | 1100111001 | 0 | 2 | 13 | 0 | 1 |
| 47 | 0100101010 | 0 | 2 | 9 | 0 | −1 | 1100101010 | 0 | 2 | 9 | 1 | −1 |
| 48 | 0100101111 | 0 | 2 | 9 | 0 | −1 | 1100101111 | 0 | 2 | 9 | 1 | −1 |
| 49 | 0100101101 | 0 | 2 | 13 | 1 | 1 | 1100101101 | 0 | 2 | 13 | 0 | 1 |
| 50 | 0100100101 | 0 | 2 | 13 | 0 | −1 | 1100100101 | 0 | 2 | 13 | 1 | −1 |
| 51 | 0100100111 | 0 | 2 | 17 | 1 | 1 | 1100100111 | 0 | 2 | 17 | 0 | 1 |
| 52 | 0101100100 | 0 | 2 | 13 | 0 | −1 | 1101100100 | 0 | 2 | 13 | 1 | −1 |
| 53 | 0101101110 | 0 | 2 | 9 | 0 | −1 | 1101101110 | 0 | 2 | 9 | 1 | −1 |
| 54 | 0101101011 | 0 | 2 | 9 | 0 | −1 | 1101101011 | 0 | 2 | 9 | 1 | −1 |
| 55 | 0101101001 | 0 | 2 | 13 | 1 | 1 | 1101101001 | 0 | 2 | 13 | 0 | 1 |

TABLE IV-continued

| No. | Q' = -1 CODE | DC | DSV | DV | P | Q | Q' = 1 CODE | DC | DSV | DV | P | Q |
|---|---|---|---|---|---|---|---|---|---|---|---|---|
| 56 | 0101111010 | 0 | 2 | 9 | 0 | -1 | 1101111010 | 0 | 2 | 9 | 1 | -1 |
| 57 | 0101111111 | 0 | 2 | 9 | 0 | -1 | 1101111111 | 0 | 2 | 9 | 1 | -1 |
| 58 | 0101111101 | 0 | 2 | 13 | 1 | 1 | 1101111101 | 0 | 2 | 13 | 0 | 1 |
| 59 | 0101110101 | 0 | 2 | 13 | 0 | -1 | 1101110101 | 0 | 2 | 13 | 1 | -1 |
| 60 | 0101010010 | 0 | 2 | 13 | 0 | -1 | 1101010010 | 0 | 2 | 13 | 1 | -1 |
| 61 | 0101010111 | 0 | 2 | 13 | 0 | -1 | 1101010111 | 0 | 2 | 13 | 1 | -1 |
| 62 | 0111000100 | 0 | 2 | 17 | 0 | -1 | 1111000100 | 0 | 2 | 17 | 1 | -1 |
| 63 | 0111001110 | 0 | 2 | 13 | 0 | -1 | 1111001110 | 0 | 2 | 13 | 1 | -1 |
| 64 | 0111001011 | 0 | 2 | 13 | 0 | -1 | 1111001011 | 0 | 2 | 13 | 1 | -1 |
| 65 | 0111001001 | 0 | 2 | 17 | 1 | 1 | 1111001001 | 0 | 2 | 17 | 0 | 1 |
| 66 | 0111011010 | 0 | 2 | 13 | 0 | -1 | 1111011010 | 0 | 2 | 13 | 1 | -1 |
| 67 | 0111011111 | 0 | 2 | 13 | 0 | -1 | 1111011111 | 0 | 2 | 13 | 1 | -1 |
| 68 | 0111110010 | 0 | 2 | 17 | 0 | -1 | 1111110010 | 0 | 2 | 17 | 1 | -1 |
| 69 | 1010001001 | 0 | 3 | 21 | 0 | -1 | 0010001001 | 0 | 3 | 21 | 1 | -1 |
| 70 | 1010011111 | 0 | 2 | 17 | 1 | 1 | 0010011111 | 0 | 2 | 17 | 0 | 1 |
| 71 | 1010011101 | 0 | 2 | 13 | 0 | -1 | 0010011101 | 0 | 2 | 13 | 1 | -1 |
| 72 | 1010010101 | 0 | 2 | 13 | 1 | 1 | 0010010101 | 0 | 2 | 13 | 0 | 1 |
| 73 | 1010010111 | 0 | 2 | 9 | 0 | -1 | 0010010111 | 0 | 2 | 9 | 1 | -1 |
| 74 | 1010010010 | 0 | 2 | 9 | 0 | -1 | 0010010010 | 0 | 2 | 9 | 1 | -1 |
| 75 | 1010110010 | 0 | 3 | 21 | 1 | 1 | 0010110010 | 0 | 3 | 21 | 0 | 1 |
| 76 | 1010110111 | 0 | 2 | 13 | 1 | 1 | 0010110111 | 0 | 2 | 13 | 0 | 1 |
| 77 | 1010110101 | 0 | 2 | 9 | 0 | -1 | 0010110101 | 0 | 2 | 9 | 1 | -1 |
| 78 | 1010111101 | 0 | 2 | 9 | 1 | 1 | 0010111101 | 0 | 2 | 9 | 0 | 1 |
| 79 | 1010111111 | 0 | 1 | 5 | 0 | -1 | 0010111111 | 0 | 1 | 5 | 1 | -1 |
| 80 | 1010111010 | 0 | 1 | 5 | 0 | -1 | 0010111010 | 0 | 1 | 5 | 1 | -1 |
| 81 | 1010101001 | 0 | 2 | 9 | 1 | 1 | 0010101001 | 0 | 2 | 9 | 0 | 1 |
| 82 | 1010101011 | 0 | 1 | 5 | 0 | -1 | 0010101011 | 0 | 1 | 5 | 1 | -1 |
| 83 | 1010101110 | 0 | 1 | 5 | 0 | -1 | 0010101110 | 0 | 1 | 5 | 1 | -1 |
| 84 | 1010100100 | 0 | 2 | 9 | 0 | -1 | 0010100100 | 0 | 2 | 9 | 1 | -1 |
| 85 | 1011100010 | 0 | 3 | 21 | 1 | 1 | 0011100010 | 0 | 3 | 21 | 0 | 1 |
| 86 | 1011100111 | 0 | 2 | 13 | 1 | 1 | 0011100111 | 0 | 2 | 13 | 0 | 1 |
| 87 | 1011100101 | 0 | 2 | 9 | 0 | -1 | 0011100101 | 0 | 2 | 9 | 1 | -1 |
| 88 | 1011101101 | 0 | 2 | 9 | 1 | 1 | 0011101101 | 0 | 2 | 9 | 0 | 1 |
| 89 | 1011101111 | 0 | 1 | 5 | 0 | -1 | 0011101111 | 0 | 1 | 5 | 1 | -1 |
| 90 | 1011101010 | 0 | 1 | 5 | 0 | -1 | 0011101010 | 0 | 1 | 5 | 1 | -1 |
| 91 | 1011111001 | 0 | 2 | 9 | 1 | 1 | 0011111001 | 0 | 2 | 9 | 0 | 1 |
| 92 | 1011111011 | 0 | 1 | 5 | 0 | -1 | 0011111011 | 0 | 1 | 5 | 1 | -1 |
| 93 | 1011111110 | 0 | 1 | 5 | 0 | -1 | 0011111110 | 0 | 1 | 5 | 1 | -1 |
| 94 | 1011110100 | 0 | 2 | 9 | 0 | -1 | 0011110100 | 0 | 2 | 9 | 1 | -1 |
| 95 | 1011010001 | 0 | 2 | 13 | 1 | 1 | 0011010001 | 0 | 2 | 13 | 0 | 1 |
| 96 | 1011010011 | 0 | 2 | 9 | 0 | -1 | 0011010011 | 0 | 2 | 9 | 1 | -1 |
| 97 | 1011010110 | 0 | 2 | 9 | 0 | -1 | 0011010110 | 0 | 2 | 9 | 1 | -1 |
| 98 | 1011011100 | 0 | 2 | 13 | 0 | -1 | 0011011100 | 0 | 2 | 13 | 1 | -1 |
| 99 | 0010000100 | 0 | 3 | 25 | 0 | -1 | 1010000100 | 0 | 3 | 25 | 1 | -1 |
| 100 | 0010001110 | 0 | 3 | 21 | 0 | -1 | 1010001110 | 0 | 3 | 21 | 1 | -1 |
| 101 | 0010001011 | 0 | 3 | 21 | 0 | -1 | 1010001011 | 0 | 3 | 21 | 1 | -1 |
| 102 | 0010011010 | 0 | 3 | 21 | 0 | -1 | 1010011010 | 0 | 3 | 21 | 1 | -1 |
| 103 | 1100101100 | 2 | 3 | 25 | 1 | -1 | 0100101100 | -2 | 3 | 25 | 0 | -1 |
| 104 | 1100100110 | 2 | 3 | 21 | 1 | -1 | 0100100110 | -2 | 3 | 21 | 0 | -1 |
| 105 | 1100100011 | 2 | 3 | 21 | 1 | -1 | 0100100011 | -2 | 3 | 21 | 0 | -1 |
| 106 | 1100100001 | 2 | 3 | 25 | 0 | 1 | 0100100001 | -2 | 3 | 25 | 1 | 1 |
| 107 | 1101111100 | 2 | 2 | 17 | 1 | -1 | 0101111100 | -2 | 2 | 17 | 0 | -1 |
| 108 | 1101110110 | 2 | 2 | 13 | 1 | -1 | 0101110110 | -2 | 2 | 13 | 0 | -1 |
| 109 | 1101110011 | 2 | 2 | 13 | 1 | -1 | 0101110011 | -2 | 2 | 13 | 0 | -1 |
| 110 | 1101111001 | 2 | 2 | 17 | 0 | 1 | 0101110001 | -2 | 2 | 17 | 1 | 1 |
| 111 | 1101010100 | 2 | 2 | 13 | 1 | -1 | 0101010100 | -2 | 2 | 13 | 0 | -1 |
| 112 | 1101011110 | 2 | 2 | 9 | 1 | -1 | 0101011110 | -2 | 2 | 9 | 0 | -1 |
| 113 | 1101011011 | 2 | 2 | 9 | 1 | -1 | 0101011011 | -2 | 2 | 9 | 0 | -1 |
| 114 | 1101011001 | 2 | 2 | 13 | 0 | 1 | 0101011001 | -2 | 2 | 13 | 1 | 1 |
| 115 | 1101001010 | 2 | 2 | 9 | 1 | -1 | 0101001010 | -2 | 2 | 9 | 0 | -1 |
| 116 | 1101001111 | 2 | 2 | 9 | 1 | -1 | 0101001111 | -2 | 2 | 9 | 0 | -1 |
| 117 | 1101001101 | 2 | 2 | 13 | 0 | 1 | 0101001101 | -2 | 2 | 13 | 1 | 1 |
| 118 | 1101000101 | 2 | 2 | 13 | 1 | -1 | 0101000101 | -2 | 2 | 13 | 0 | — |
| 119 | 1101000111 | 2 | 2 | 17 | 0 | 1 | 0101000111 | -2 | 2 | 17 | 1 | 1 |
| 120 | 1101000010 | 2 | 3 | 25 | 0 | 1 | 0101000010 | -2 | 3 | 25 | 1 | 1 |
| 121 | 1111011100 | 2 | 2 | 13 | 1 | -1 | 0111011100 | -2 | 2 | 13 | 0 | -1 |
| 122 | 1111010110 | 2 | 2 | 9 | 1 | -1 | 0111010110 | -2 | 2 | 9 | 0 | -1 |
| 123 | 1111010011 | 2 | 2 | 9 | 1 | -1 | 0111010011 | -2 | 2 | 9 | 0 | -1 |
| 124 | 1111010001 | 2 | 2 | 13 | 0 | 1 | 0111010001 | -2 | 2 | 13 | 1 | 1 |
| 125 | 1111110100 | 2 | 2 | 9 | 1 | -1 | 0111110100 | -2 | 2 | 9 | 0 | -1 |
| 126 | 1111111110 | 2 | 1 | 5 | 1 | -1 | 0111111110 | -2 | 1 | 5 | 0 | -1 |
| 127 | 1111111011 | 2 | 1 | 5 | 1 | -1 | 0111111011 | -2 | 1 | 5 | 0 | -1 |
| 128 | 1111111001 | 2 | 2 | 9 | 0 | 1 | 0111111001 | -2 | 2 | 9 | 1 | 1 |
| 129 | 1111101010 | 2 | 1 | 5 | 1 | -1 | 0111101010 | -2 | 1 | 5 | 0 | -1 |
| 130 | 1111101111 | 2 | 1 | 5 | 1 | -1 | 0111101111 | -2 | 1 | 5 | 0 | -1 |
| 131 | 1111101101 | 2 | 2 | 9 | 0 | 1 | 0111101101 | -2 | 2 | 9 | 1 | 1 |
| 132 | 1111100101 | 2 | 2 | 9 | 1 | -1 | 0111100101 | -2 | 2 | 9 | 0 | -1 |
| 133 | 1111100111 | 2 | 2 | 13 | 0 | 1 | 0111100111 | -2 | 2 | 13 | 1 | 1 |
| 134 | 1111100010 | 2 | 3 | 21 | 0 | 1 | 0111100010 | -2 | 3 | 21 | 1 | 1 |
| 135 | 1110100100 | 2 | 2 | 9 | 1 | -1 | 0110100100 | -2 | 2 | 9 | 0 | -1 |

TABLE IV-continued

| No. | Q' = −1 CODE | DC | DSV | DV | P | Q | Q' = 1 CODE | DC | DSV | DV | P | Q |
|---|---|---|---|---|---|---|---|---|---|---|---|---|
| 136 | 1110101110 | 2 | 1 | 5 | 1 | −1 | 0110101110 | −2 | 1 | 5 | 0 | −1 |
| 137 | 1110101011 | 2 | 1 | 5 | 1 | −1 | 0110101011 | −2 | 1 | 5 | 0 | −1 |
| 138 | 1110101001 | 2 | 2 | 9 | 0 | 1 | 0110101001 | −2 | 2 | 9 | 1 | 1 |
| 139 | 1110111010 | 2 | 1 | 5 | 1 | −1 | 0110111010 | −2 | 1 | 5 | 0 | −1 |
| 140 | 1110111111 | 2 | 1 | 5 | 1 | −1 | 0110111111 | −2 | 1 | 5 | 0 | −1 |
| 141 | 1110111101 | 2 | 2 | 9 | 0 | 1 | 0110111101 | −2 | 2 | 9 | 1 | 1 |
| 142 | 1110110101 | 2 | 2 | 9 | 1 | −1 | 0110110101 | −2 | 2 | 9 | 0 | −1 |
| 143 | 1110110111 | 2 | 2 | 13 | 0 | 1 | 0110110111 | −2 | 2 | 13 | 1 | 1 |
| 144 | 1110110010 | 2 | 3 | 21 | 0 | 1 | 0110110010 | −2 | 3 | 21 | 1 | 1 |
| 145 | 1110010010 | 2 | 2 | 9 | 1 | −1 | 0110010010 | −2 | 2 | 9 | 0 | −1 |
| 146 | 1110010111 | 2 | 2 | 9 | 1 | −1 | 0110010111 | −2 | 2 | 9 | 0 | −1 |
| 147 | 1110010101 | 2 | 2 | 13 | 0 | 1 | 0110010101 | −2 | 2 | 13 | 1 | 1 |
| 148 | 1110011101 | 2 | 2 | 13 | 1 | −1 | 0110011101 | −2 | 2 | 13 | 0 | −1 |
| 149 | 1110011111 | 2 | 2 | 17 | 0 | 1 | 0110011111 | −2 | 2 | 17 | 1 | 1 |
| 150 | 1110011010 | 2 | 3 | 25 | 0 | 1 | 0110011010 | −2 | 3 | 25 | 1 | 1 |
| 151 | 1110001001 | 2 | 3 | 21 | 1 | −1 | 0110001001 | −2 | 3 | 21 | 0 | −1 |
| 152 | 1110001011 | 2 | 3 | 25 | 0 | 1 | 0110001011 | −2 | 3 | 25 | 1 | 1 |
| 153 | 1110001110 | 2 | 3 | 33 | 0 | 1 | 0110001110 | −2 | 3 | 33 | 1 | 1 |
| 154 | 1110000100 | 2 | 4 | 45 | 0 | 1 | 0110000100 | −2 | 4 | 45 | 1 | 1 |
| 155 | 1010011100 | 2 | 2 | 13 | 1 | −1 | 0010011100 | −2 | 2 | 13 | 0 | −1 |
| 156 | 1010010110 | 2 | 2 | 9 | 1 | −1 | 0010010110 | −2 | 2 | 9 | 0 | −1 |
| 157 | 1010010011 | 2 | 2 | 9 | 1 | −1 | 0010010011 | −2 | 2 | 9 | 0 | −1 |
| 158 | 1010010001 | 2 | 2 | 13 | 0 | 1 | 0010010001 | −2 | 2 | 13 | 1 | 1 |
| 159 | 1010110100 | 2 | 2 | 9 | 1 | −1 | 0010110100 | −2 | 2 | 9 | 0 | −1 |
| 160 | 1010111110 | 2 | 1 | 5 | 1 | −1 | 0010111110 | −2 | 1 | 5 | 0 | −1 |
| 161 | 1010111011 | 2 | 1 | 5 | 1 | −1 | 0010111011 | −2 | 1 | 5 | 0 | −1 |
| 162 | 1010111001 | 2 | 2 | 9 | 0 | 1 | 0010111001 | −2 | 2 | 9 | 1 | 1 |
| 163 | 1010101010 | 2 | 1 | 5 | 1 | −1 | 0010101010 | −2 | 1 | 5 | 0 | −1 |
| 164 | 1010101111 | 2 | 1 | 5 | 1 | −1 | 0010101111 | −2 | 1 | 5 | 0 | −1 |
| 165 | 1010101101 | 2 | 2 | 9 | 0 | 1 | 0010101101 | −2 | 2 | 9 | 1 | 1 |
| 166 | 1010100101 | 2 | 2 | 9 | 1 | −1 | 0010100101 | −2 | 2 | 9 | 0 | −1 |
| 167 | 1010100111 | 2 | 2 | 13 | 0 | 1 | 0010100111 | −2 | 2 | 13 | 1 | 1 |
| 168 | 1010100010 | 2 | 3 | 21 | 0 | 1 | 0010100010 | −2 | 3 | 21 | 1 | 1 |
| 169 | 1011100100 | 2 | 2 | 9 | 1 | −1 | 0011100100 | −2 | 2 | 9 | 0 | −1 |
| 170 | 1011101110 | 2 | 1 | 5 | 1 | −1 | 0011101110 | −2 | 1 | 5 | 0 | −1 |
| 171 | 1011101011 | 2 | 1 | 5 | 1 | −1 | 0011101011 | −2 | 1 | 5 | 0 | −1 |
| 172 | 1011101001 | 2 | 2 | 9 | 0 | 1 | 0011101001 | −2 | 2 | 9 | 1 | 1 |
| 173 | 1011111010 | 2 | 1 | 5 | 1 | −1 | 0011111010 | −2 | 1 | 5 | 0 | −1 |
| 174 | 1011111111 | 2 | 1 | 5 | 1 | −1 | 0011111111 | −2 | 1 | 5 | 0 | −1 |
| 175 | 1011111101 | 2 | 2 | 9 | 0 | 1 | 0011111101 | −2 | 2 | 9 | 1 | 1 |
| 176 | 1011110101 | 2 | 2 | 9 | 1 | −1 | 0011110101 | −2 | 2 | 9 | 0 | −1 |
| 177 | 1011110111 | 2 | 2 | 13 | 0 | 1 | 0011110111 | −2 | 2 | 13 | 1 | 1 |
| 178 | 1011110010 | 2 | 3 | 21 | 0 | 1 | 0011110010 | −2 | 3 | 21 | 1 | 1 |
| 179 | 1011010010 | 2 | 2 | 9 | 1 | −1 | 0011010010 | −2 | 2 | 9 | 0 | −1 |
| 180 | 1011010111 | 2 | 2 | 9 | 1 | −1 | 0011010111 | −2 | 2 | 9 | 0 | −1 |
| 181 | 1011010101 | 2 | 2 | 13 | 0 | 1 | 0011010101 | −2 | 2 | 13 | 1 | 1 |
| 182 | 1011011101 | 2 | 2 | 13 | 1 | −1 | 0011011101 | −2 | 2 | 13 | 0 | −1 |
| 183 | 1011011111 | 2 | 2 | 17 | 0 | 1 | 0011011111 | −2 | 2 | 17 | 1 | 1 |
| 184 | 1011011010 | 2 | 3 | 25 | 0 | 1 | 0011011010 | −2 | 3 | 25 | 0 | 1 |
| 185 | 1011001001 | 2 | 3 | 21 | 1 | −1 | 0011001001 | −2 | 3 | 21 | 0 | −1 |
| 186 | 1011001011 | 2 | 3 | 25 | 0 | 1 | 0011001011 | −2 | 3 | 25 | 1 | 1 |
| 187 | 1011001110 | 2 | 3 | 33 | 0 | 1 | 0011001110 | −2 | 3 | 33 | 1 | 1 |
| 188 | 1011000100 | 2 | 4 | 45 | 0 | 1 | 0011000100 | −2 | 4 | 45 | 1 | 1 |
| 189 | 0100001110 | 2 | 3 | 37 | 0 | 1 | 1100001110 | −2 | 3 | 37 | 1 | 1 |
| 190 | 0100001011 | 2 | 3 | 29 | 0 | 1 | 1100001011 | −2 | 3 | 29 | 1 | 1 |
| 191 | 0100001001 | 2 | 3 | 25 | 1 | −1 | 1100001001 | −2 | 3 | 25 | 0 | −1 |
| 192 | 0100011010 | 2 | 3 | 29 | 0 | 1 | 1100011010 | −2 | 3 | 29 | 1 | 1 |
| 193 | 0100011111 | 2 | 2 | 21 | 0 | 1 | 1100011111 | −2 | 2 | 21 | 1 | 1 |
| 194 | 0100011101 | 2 | 2 | 17 | 1 | −1 | 1100011101 | −2 | 2 | 17 | 0 | −1 |
| 195 | 0100010101 | 2 | 2 | 17 | 0 | 1 | 1100010101 | −2 | 2 | 17 | 1 | 1 |
| 196 | 0100010111 | 2 | 2 | 13 | 1 | −1 | 1100010111 | −2 | 2 | 13 | 0 | −1 |
| 197 | 0100010010 | 2 | 2 | 13 | 1 | −1 | 1100010010 | −2 | 2 | 13 | 0 | −1 |
| 198 | 0100110010 | 2 | 3 | 25 | 0 | 1 | 1100110010 | −2 | 3 | 25 | 1 | 1 |
| 199 | 0100110111 | 2 | 2 | 17 | 0 | 1 | 1100110111 | −2 | 2 | 17 | 1 | 1 |
| 200 | 0100110101 | 2 | 2 | 13 | 1 | −1 | 1100110101 | −2 | 2 | 13 | 0 | −1 |
| 201 | 0100111101 | 2 | 2 | 13 | 0 | 1 | 1100111101 | −2 | 2 | 13 | 1 | 1 |
| 202 | 0100111111 | 2 | 2 | 9 | 1 | −1 | 1100111111 | −2 | 2 | 9 | 0 | −1 |
| 203 | 0100111010 | 2 | 2 | 9 | 1 | −1 | 1100111010 | −2 | 2 | 9 | 0 | −1 |
| 204 | 0100101001 | 2 | 2 | 13 | 0 | 1 | 1100101001 | −2 | 2 | 13 | 1 | 1 |
| 205 | 0100101011 | 2 | 2 | 9 | 1 | −1 | 1100101011 | −2 | 2 | 9 | 0 | −1 |
| 206 | 0100101110 | 2 | 2 | 9 | 1 | −1 | 1100101110 | −2 | 2 | 9 | 0 | −1 |
| 207 | 0100100100 | 2 | 2 | 13 | 1 | −1 | 1100100100 | −2 | 2 | 13 | 0 | −1 |
| 208 | 0101100010 | 2 | 3 | 25 | 0 | 1 | 1101100010 | −2 | 3 | 25 | 1 | 1 |
| 209 | 0101100111 | 2 | 2 | 17 | 0 | 1 | 1101100111 | −2 | 2 | 17 | 1 | 1 |
| 210 | 0101100101 | 2 | 2 | 13 | 1 | −1 | 1101100101 | −2 | 2 | 13 | 0 | −1 |
| 211 | 0101101101 | 2 | 2 | 13 | 0 | 1 | 1101101101 | −2 | 2 | 13 | 1 | 1 |
| 212 | 0101101111 | 2 | 2 | 9 | 1 | −1 | 1101101111 | −2 | 2 | 9 | 0 | −1 |
| 213 | 0101101010 | 2 | 2 | 9 | 1 | −1 | 1101101010 | −2 | 2 | 9 | 0 | −1 |
| 214 | 0101111001 | 2 | 2 | 13 | 0 | 1 | 1101111001 | −2 | 2 | 13 | 1 | 1 |
| 215 | 0101111011 | 2 | 2 | 9 | 1 | −1 | 1101111011 | −2 | 2 | 9 | 0 | −1 |

TABLE IV-continued

| No. | Q' = −1 CODE | DC | DSV | DV | P | Q | Q' = 1 CODE | DC | DSV | DV | P | Q |
|---|---|---|---|---|---|---|---|---|---|---|---|---|
| 216 | 0101111110 | 2 | 2 | 9 | 1 | −1 | 1101111110 | −2 | 2 | 9 | 0 | −1 |
| 217 | 0101110100 | 2 | 2 | 13 | 1 | −1 | 1101110100 | −2 | 2 | 13 | 0 | −1 |
| 218 | 0101010001 | 2 | 2 | 17 | 0 | 1 | 1101010001 | −2 | 2 | 17 | 1 | 1 |
| 219 | 0101010011 | 2 | 2 | 13 | 1 | −1 | 1101010011 | −2 | 2 | 13 | 0 | −1 |
| 220 | 0101010110 | 2 | 2 | 13 | 1 | −1 | 1101010110 | −2 | 2 | 13 | 0 | −1 |
| 221 | 0101011100 | 2 | 2 | 17 | 1 | −1 | 1101011100 | −2 | 2 | 17 | 0 | −1 |
| 222 | 0111000010 | 2 | 3 | 29 | 0 | 1 | 1111000010 | −2 | 3 | 29 | 1 | 1 |
| 223 | 0111000111 | 2 | 2 | 21 | 0 | 1 | 1111000111 | −2 | 2 | 21 | 1 | 1 |
| 224 | 0111000101 | 2 | 2 | 17 | 1 | −1 | 1111000101 | −2 | 2 | 17 | 0 | −1 |
| 225 | 0111001101 | 2 | 2 | 17 | 0 | 1 | 1111001101 | −2 | 2 | 17 | 1 | 1 |
| 226 | 0111001111 | 2 | 2 | 13 | 1 | −1 | 1111001111 | −2 | 2 | 13 | 0 | −1 |
| 227 | 0111001010 | 2 | 2 | 13 | 1 | −1 | 1111001010 | −2 | 2 | 13 | 0 | −1 |
| 228 | 0111011001 | 2 | 2 | 17 | 0 | 1 | 1111011001 | −2 | 2 | 17 | 1 | 1 |
| 229 | 0111011011 | 2 | 2 | 13 | 1 | −1 | 1111011011 | −2 | 2 | 13 | 0 | −1 |
| 230 | 0111011110 | 2 | 2 | 13 | 1 | −1 | 1111011110 | −2 | 2 | 13 | 0 | −1 |
| 231 | 0111010100 | 2 | 2 | 17 | 1 | −1 | 1111010100 | −2 | 2 | 17 | 0 | −1 |
| 232 | 0111110001 | 2 | 2 | 21 | 0 | 1 | 1111110001 | −2 | 2 | 21 | 1 | 1 |
| 233 | 0111110011 | 2 | 2 | 17 | 1 | −1 | 1111110011 | −2 | 2 | 17 | 0 | −1 |
| 234 | 0111110110 | 2 | 2 | 17 | 1 | −1 | 1111110110 | −2 | 2 | 17 | 0 | −1 |
| 235 | 0111111100 | 2 | 2 | 21 | 1 | −1 | 1111111100 | −2 | 2 | 21 | 0 | −1 |
| 236 | 0110100001 | 2 | 3 | 29 | 0 | 1 | 1110100001 | −2 | 3 | 29 | 1 | 1 |
| 237 | 0110100011 | 2 | 3 | 25 | 1 | −1 | 1110100011 | −2 | 3 | 25 | 0 | −1 |
| 238 | 0110100110 | 2 | 3 | 25 | 1 | −1 | 1110100110 | −2 | 3 | 25 | 0 | −1 |
| 239 | 0110101100 | 2 | 3 | 29 | 1 | −1 | 1110101100 | −2 | 3 | 29 | 0 | −1 |
| 240 | 0010000111 | 2 | 3 | 29 | 0 | 1 | 1010000111 | −2 | 3 | 29 | 1 | 1 |
| 241 | 0010000101 | 2 | 3 | 25 | 1 | −1 | 1010000101 | −2 | 3 | 25 | 0 | −1 |
| 242 | 0010001101 | 2 | 3 | 25 | 0 | 1 | 1010001101 | −2 | 3 | 25 | 1 | 1 |
| 243 | 0010001111 | 2 | 3 | 21 | 1 | −1 | 1010001111 | −2 | 3 | 21 | 0 | −1 |
| 244 | 0010001010 | 2 | 3 | 21 | 1 | −1 | 1010001010 | −2 | 3 | 21 | 0 | −1 |
| 245 | 0010011001 | 2 | 3 | 25 | 0 | 1 | 1010011001 | −2 | 3 | 25 | 1 | 1 |
| 246 | 0010011011 | 2 | 3 | 21 | 1 | −1 | 1010011011 | −2 | 3 | 21 | 0 | −1 |
| 247 | 0010011110 | 2 | 3 | 21 | 1 | −1 | 1010011110 | −2 | 3 | 21 | 0 | −1 |
| 248 | 0010010100 | 2 | 3 | 25 | 1 | −1 | 1010010100 | −2 | 3 | 25 | 0 | −1 |
| 249 | 0010110001 | 2 | 3 | 29 | 0 | 1 | 1010110001 | −2 | 3 | 29 | 1 | 1 |
| 250 | 0010110011 | 2 | 3 | 25 | 1 | −1 | 1010110011 | −2 | 3 | 25 | 0 | −1 |
| 251 | 0010110110 | 2 | 3 | 25 | 1 | −1 | 1010110110 | −2 | 3 | 25 | 0 | −1 |
| 252 | 0010111100 | 2 | 3 | 29 | 1 | −1 | 1010111100 | −2 | 3 | 29 | 0 | −1 |
| 253 | 0011100001 | 2 | 3 | 37 | 0 | 1 | 1011100001 | −2 | 3 | 37 | 1 | 1 |
| 254 | 0011100011 | 2 | 3 | 33 | 1 | −1 | 1011100011 | −2 | 3 | 33 | 0 | −1 |
| 255 | 0011100110 | 2 | 3 | 33 | 1 | −1 | 1011100110 | −2 | 3 | 33 | 0 | −1 |
| 256 | 0011101100 | 2 | 3 | 37 | 1 | −1 | 1011101100 | −2 | 3 | 37 | 0 | −1 |

An example in which DSV variance is small and a wide selection range of combinations or code words is available will be described.

In Table IV, when the distribution of |DSV| is considered, almost all of |DSV| lies within a range of |DSV|≦3 and only the codes of Nos. 154 and 188 have |DSV|=4. Accordingly, in the selection method based on Table III, the absolute value of DSV can be maximized to 4.

However, if the absolute value of DSV can be maximized to 3, of 256 possible combinations on Table IV, two combinations corresponding to the above codes of Nos. 154 and 188 can not be used with the result that, in accordance with the selection method based on Table III, only 254 combinations are made possible.

However, if |DSV|≦3 is satisfied, a combination beginning with "0001 . . . " and a combination with three consecutive digital zeroes which can not be used in the selection method based on Table III become possible for the two additional codes or combinations. Because, ". . . 100" never appears at the end of a combination or code which carries DSV=+1 to the next combination, it becomes possible to use a combination which begins with "0001 . . ." only when the evaluation of DSV variance begins with DSV=+1.

Figure 7:
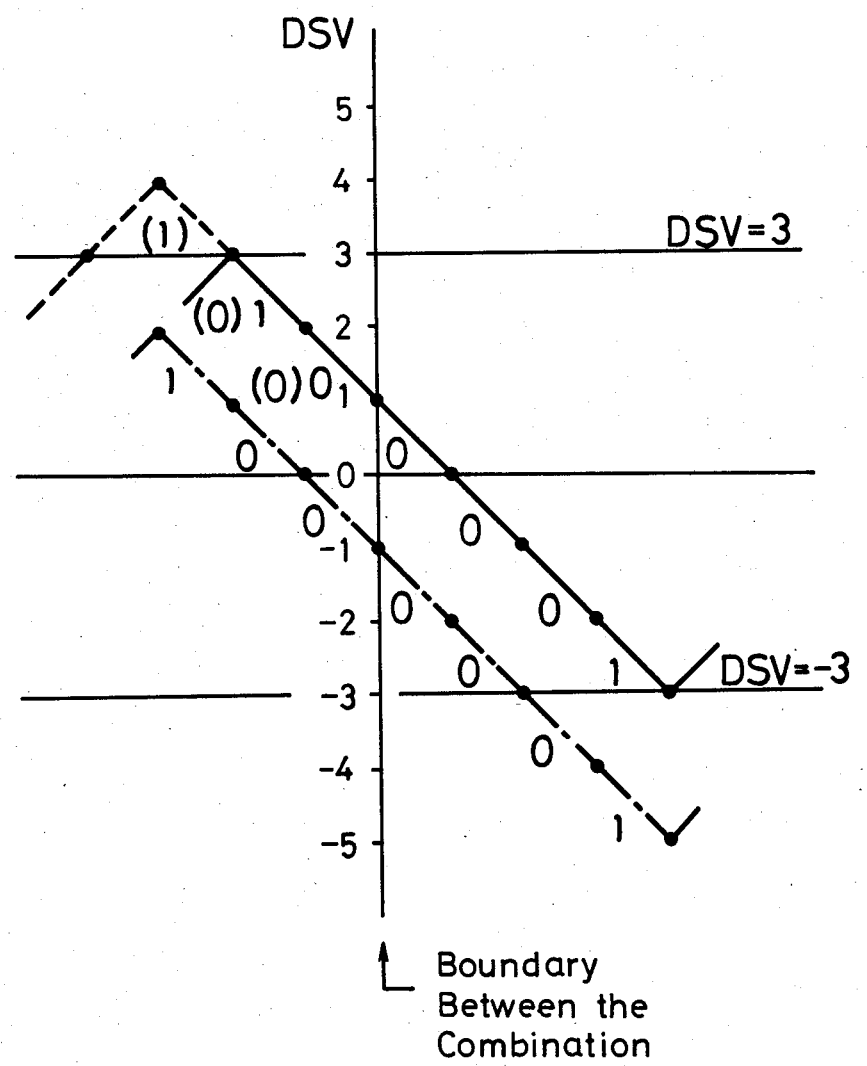
FIG. 7 illustrates a variance of DSV at a boundary between code words or combinations.

This will further be described with reference to FIG. 7. If, now, a next or succeeding code word or combination begins with "0001 . . . " and the evaluation of DSV variance thereof begins with DSV=+1, as shown by a solid line in FIG. 7, the preceding combination or code word ends with ". . . 10" because of the condition, |DSV|≦3. In this connection, if the condition of |DSV|≦4 is satisfied, as shown by a broken line in FIG. 7, the preceding combination or code word ends with ". . . 100" and five consecutive digital zeroes appear at the boundary between the preceding and succeeding combinations or code words. This does not satisfy the condition of Tmax=5T'.

If the next combination begins with "0001 . . . " and the evaluation of DSV variance begins with DSV=−1, as shown by a one-dot chain line in FIG. 7, the portion of the preceding combination or code word beginning with "100 . . . " lies within a range of |DSV|≦3 but the portion of the succeeding combination or code word beginning with "0001 . . . " exceeds a range limited by DSV=−4. In addition, five consecutive digital zeroes appear at the boundary between the preceding and succeeding combinations, which then can not satisfy the condition of Tmax=5T'.

Accordingly, if a combination or code word is made so as to satisfy the condition of |DSV|≦3, when the evaluation of DSV variance thereof begins with DSV=+1, it becomes possible to use a combination beginning with "0001 . . . " as the succeeding combination or code word that is, a code word with zero or −2 DC component or disparity.

The number of possible combinations for 10-bit data which can be selected in this case will be shown on the following Table V.

TABLE V

| first bit | | DC −2 | | 0 | | +2 | |
|---|---|---|---|---|---|---|---|
| 1 | 11... | 71 | 51 | 116 | 68 | 103 | 51 |
|   | 101... |    | 17 |    | 34 |    | 33 |
|   | 1001... |   | 3  |    | 14 |    | 19 |
| 0 | 01... | 103 | 51 | 116 | 68 | 71 | 51 |
|   | 001... |    | 33 |    | 34 |    | 17 |
|   | 0001... |   | 19 |    | 14 |    | 3  |

In Table V, three combinations having +2 DC component or disparity and beginning with "0001..." can not be used by this selection method because a combination with +2 DC component or disparity is used at DSV=−1. Consequently, it is not possible to use three combinations or code words with −2 DC component or disparity and beginning with "1001..." which form pairs with the three code words beginning with "0001..." and having a +2 DC component. Therefore, except for the noted code words or combinations, it becomes possible to use 278 pairs of code words or combinations (116 pairs combinations with zero DC component and 171 pairs of combinations with ±2 DC components, respectively).

Table VI shows examples of 287 different pairs of combinations (codes) selected on the basis of Table V. These combinations are not made corresponding to data. In Table VI, one or the other of a pair of combinations is selected only by controlling the level of the first bit, similarly to Table IV. In Table VI, references such as Q′ and so on are used for the same purposes as in Table VI.

TABLE VI

| No. | Q′ = −1 CODE | DC | DSV | DV | P | Q | Q′ = 1 CODE | DC | DSV | DV | P | Q |
|---|---|---|---|---|---|---|---|---|---|---|---|---|
| 1 | 1100100010 | 0 | 3 | 21 | 0 | −1 | 0100100010 | 0 | 3 | 21 | 1 | −1 |
| 2 | 1101110111 | 0 | 2 | 13 | 0 | −1 | 0101110111 | 0 | 2 | 13 | 1 | −1 |
| 3 | 1101110010 | 0 | 2 | 13 | 0 | −1 | 0101110010 | 0 | 2 | 13 | 1 | −1 |
| 4 | 1101010101 | 0 | 2 | 13 | 0 | −1 | 0101010101 | 0 | 2 | 13 | 1 | −1 |
| 5 | 1101011101 | 0 | 2 | 13 | 1 | 1 | 0101011101 | 0 | 2 | 13 | 0 | 1 |
| 6 | 1101011111 | 0 | 2 | 9 | 0 | −1 | 0101011111 | 0 | 2 | 9 | 1 | −1 |
| 7 | 1101011010 | 0 | 2 | 9 | 0 | −1 | 0101011010 | 0 | 2 | 9 | 1 | −1 |
| 8 | 1101001001 | 0 | 2 | 13 | 1 | 1 | 0101001001 | 0 | 2 | 13 | 0 | 1 |
| 9 | 1101001011 | 0 | 2 | 9 | 0 | −1 | 0101001011 | 0 | 2 | 9 | 1 | −1 |
| 10 | 1101001110 | 0 | 2 | 9 | 0 | −1 | 0101001110 | 0 | 2 | 9 | 1 | −1 |
| 11 | 1101000100 | 0 | 2 | 13 | 0 | −1 | 0101000100 | 0 | 2 | 13 | 1 | −1 |
| 12 | 1111011101 | 0 | 2 | 13 | 0 | −1 | 0111011101 | 0 | 2 | 13 | 1 | −1 |
| 13 | 1111010101 | 0 | 2 | 13 | 1 | 1 | 0111010101 | 0 | 2 | 13 | 0 | 1 |
| 14 | 1111010111 | 0 | 2 | 9 | 0 | −1 | 0111010111 | 0 | 2 | 9 | 1 | −1 |
| 15 | 1111010010 | 0 | 2 | 9 | 0 | −1 | 0111010010 | 0 | 2 | 9 | 1 | −1 |
| 16 | 1111110111 | 0 | 2 | 13 | 1 | 1 | 0111110111 | 0 | 2 | 13 | 0 | 1 |
| 17 | 1111110101 | 0 | 2 | 9 | 0 | −1 | 0111110101 | 0 | 2 | 9 | 1 | −1 |
| 18 | 1111111101 | 0 | 2 | 9 | 1 | 1 | 0111111101 | 0 | 2 | 9 | 0 | 1 |
| 19 | 1111111111 | 0 | 1 | 5 | 0 | −1 | 0111111111 | 0 | 1 | 5 | 1 | −1 |
| 20 | 1111111010 | 0 | 1 | 5 | 0 | −1 | 0111111010 | 0 | 1 | 5 | 1 | −1 |
| 21 | 1111101001 | 0 | 2 | 9 | 1 | 1 | 0111101001 | 0 | 2 | 9 | 0 | 1 |
| 22 | 1111101011 | 0 | 1 | 5 | 0 | −1 | 0111101011 | 0 | 1 | 5 | 1 | −1 |
| 23 | 1111101110 | 0 | 1 | 5 | 0 | −1 | 0111101110 | 0 | 1 | 5 | 1 | −1 |
| 24 | 1111100100 | 0 | 2 | 9 | 0 | −1 | 0111100100 | 0 | 2 | 9 | 1 | −1 |
| 25 | 1110100010 | 0 | 3 | 21 | 1 | 1 | 0110100010 | 0 | 3 | 21 | 0 | 1 |
| 26 | 1110100111 | 0 | 2 | 13 | 1 | 1 | 0110100111 | 0 | 2 | 13 | 0 | 1 |
| 27 | 1110100101 | 0 | 2 | 9 | 0 | −1 | 0110100101 | 0 | 2 | 9 | 1 | −1 |
| 28 | 1110101101 | 0 | 2 | 9 | 1 | 1 | 0110101101 | 0 | 2 | 9 | 0 | 1 |
| 29 | 1110101111 | 0 | 1 | 5 | 0 | −1 | 0110101111 | 0 | 1 | 5 | 1 | −1 |
| 30 | 1110101010 | 0 | 1 | 5 | 0 | −1 | 0110101010 | 0 | 1 | 5 | 1 | −1 |
| 31 | 1110111001 | 0 | 2 | 9 | 1 | 1 | 0110111001 | 0 | 2 | 9 | 0 | 1 |
| 32 | 1110111011 | 0 | 1 | 5 | 0 | −1 | 0110111011 | 0 | 1 | 5 | 1 | −1 |
| 33 | 1110111110 | 0 | 1 | 5 | 0 | −1 | 0110111110 | 0 | 1 | 5 | 1 | −1 |
| 34 | 1110110100 | 0 | 2 | 9 | 0 | −1 | 0110110100 | 0 | 2 | 9 | 1 | −1 |
| 35 | 1110010001 | 0 | 2 | 13 | 1 | 1 | 0110010001 | 0 | 2 | 13 | 0 | 1 |
| 36 | 1110010011 | 0 | 2 | 9 | 0 | −1 | 0110010011 | 0 | 2 | 9 | 1 | −1 |
| 37 | 1110010110 | 0 | 2 | 9 | 0 | −1 | 0110010110 | 0 | 2 | 9 | 1 | −1 |
| 38 | 1110011100 | 0 | 2 | 13 | 0 | −1 | 0110011100 | 0 | 2 | 13 | 1 | −1 |
| 39 | 0100011100 | 0 | 2 | 17 | 0 | −1 | 1100011100 | 0 | 2 | 17 | 1 | −1 |
| 40 | 0100010110 | 0 | 2 | 13 | 0 | −1 | 1100010110 | 0 | 2 | 13 | 1 | −1 |
| 41 | 0100010011 | 0 | 2 | 13 | 0 | −1 | 1100010011 | 0 | 2 | 13 | 1 | −1 |
| 42 | 0100010001 | 0 | 2 | 17 | 1 | 1 | 1100010001 | 0 | 2 | 17 | 0 | 1 |
| 43 | 0100110100 | 0 | 2 | 13 | 0 | −1 | 1100110100 | 0 | 2 | 13 | 1 | −1 |
| 44 | 0100111110 | 0 | 2 | 9 | 0 | −1 | 1100111110 | 0 | 2 | 9 | 1 | −1 |
| 45 | 0100111011 | 0 | 2 | 9 | 0 | −1 | 1100111011 | 0 | 2 | 9 | 1 | −1 |
| 46 | 0100111001 | 0 | 2 | 13 | 1 | 1 | 1100111001 | 0 | 2 | 13 | 0 | 1 |
| 47 | 0100101010 | 0 | 2 | 9 | 0 | −1 | 1100101010 | 0 | 2 | 9 | 1 | −1 |
| 48 | 0100101111 | 0 | 2 | 9 | 0 | −1 | 1100101111 | 0 | 2 | 9 | 1 | −1 |
| 49 | 0100101101 | 0 | 2 | 13 | 1 | 1 | 1100101101 | 0 | 2 | 13 | 0 | 1 |
| 50 | 0100100101 | 0 | 2 | 13 | 0 | −1 | 1100100101 | 0 | 2 | 13 | 1 | −1 |
| 51 | 0100100111 | 0 | 2 | 17 | 1 | 1 | 1100100111 | 0 | 2 | 17 | 0 | 1 |
| 52 | 0101100100 | 0 | 2 | 13 | 0 | −1 | 1101100100 | 0 | 2 | 13 | 1 | −1 |
| 53 | 0101101110 | 0 | 2 | 9 | 0 | −1 | 1101101110 | 0 | 2 | 9 | 1 | −1 |
| 54 | 0101101011 | 0 | 2 | 9 | 0 | −1 | 1101101011 | 0 | 2 | 9 | 1 | −1 |
| 55 | 0101101001 | 0 | 2 | 13 | 1 | 1 | 1101101001 | 0 | 2 | 13 | 0 | 1 |
| 56 | 0101111010 | 0 | 2 | 9 | 0 | −1 | 1101111010 | 0 | 2 | 9 | 1 | −1 |
| 57 | 0101111111 | 0 | 2 | 9 | 0 | −1 | 1101111111 | 0 | 2 | 9 | 1 | −1 |
| 58 | 0101111101 | 0 | 2 | 13 | 1 | 1 | 1101111101 | 0 | 2 | 13 | 0 | 1 |
| 59 | 0101110101 | 0 | 2 | 13 | 0 | −1 | 1101110101 | 0 | 2 | 13 | 1 | −1 |
| 60 | 0101010010 | 0 | 2 | 13 | 0 | −1 | 1101010010 | 0 | 2 | 13 | 1 | −1 |

TABLE VI-continued

| No. | Q' = −1 CODE | DC | DSV | DV | P | Q | Q' = 1 CODE | DC | DSV | DV | P | Q |
|---|---|---|---|---|---|---|---|---|---|---|---|---|
| 61 | 0101010111 | 0 | 2 | 13 | 0 | −1 | 1101010111 | 0 | 2 | 13 | 1 | −1 |
| 62 | 0111000100 | 0 | 2 | 17 | 0 | −1 | 1111000100 | 0 | 2 | 17 | 1 | −1 |
| 63 | 0111001110 | 0 | 2 | 13 | 0 | −1 | 1111001110 | 0 | 2 | 13 | 1 | −1 |
| 64 | 0111001011 | 0 | 2 | 13 | 0 | −1 | 1111001011 | 0 | 2 | 13 | 1 | −1 |
| 65 | 0111001001 | 0 | 2 | 17 | 1 | 1 | 1111001001 | 0 | 2 | 17 | 0 | 1 |
| 66 | 0111011010 | 0 | 2 | 13 | 0 | −1 | 1111011010 | 0 | 2 | 13 | 1 | −1 |
| 67 | 0111011111 | 0 | 2 | 13 | 0 | −1 | 1111011111 | 0 | 2 | 13 | 1 | −1 |
| 68 | 0111110010 | 0 | 2 | 17 | 0 | −1 | 1111110010 | 0 | 2 | 17 | 1 | −1 |
| 69 | 1010001001 | 0 | 3 | 21 | 0 | −1 | 0010001001 | 0 | 3 | 21 | 1 | −1 |
| 70 | 1010011111 | 0 | 2 | 17 | 1 | 1 | 0010011111 | 0 | 2 | 17 | 0 | 1 |
| 71 | 1010011101 | 0 | 2 | 13 | 0 | −1 | 0010011101 | 0 | 2 | 13 | 1 | −1 |
| 72 | 1010010101 | 0 | 2 | 13 | 1 | 1 | 0010010101 | 0 | 2 | 13 | 0 | 1 |
| 73 | 1010010111 | 0 | 2 | 9 | 0 | −1 | 0010010111 | 0 | 2 | 9 | 1 | −1 |
| 74 | 1010010010 | 0 | 2 | 9 | 0 | −1 | 0010010010 | 0 | 2 | 9 | 1 | −1 |
| 75 | 1010110010 | 0 | 3 | 21 | 1 | 1 | 0010110010 | 0 | 3 | 21 | 0 | 1 |
| 76 | 1010110111 | 0 | 2 | 13 | 1 | 1 | 0010110111 | 0 | 2 | 13 | 0 | 1 |
| 77 | 1010110101 | 0 | 2 | 9 | 0 | −1 | 0010110101 | 0 | 2 | 9 | 1 | −1 |
| 78 | 1010111101 | 0 | 2 | 9 | 1 | 1 | 0010111101 | 0 | 2 | 9 | 0 | 1 |
| 79 | 1010111111 | 0 | 1 | 5 | 0 | −1 | 0010111111 | 0 | 1 | 5 | 1 | −1 |
| 80 | 1010111010 | 0 | 1 | 5 | 0 | −1 | 0010111010 | 0 | 1 | 5 | 1 | −1 |
| 81 | 1010101001 | 0 | 2 | 9 | 1 | 1 | 0010101001 | 0 | 2 | 9 | 0 | 1 |
| 82 | 1010101011 | 0 | 1 | 5 | 0 | −1 | 0010101011 | 0 | 1 | 5 | 1 | −1 |
| 83 | 1010101110 | 0 | 1 | 5 | 0 | −1 | 0010101110 | 0 | 1 | 5 | 1 | −1 |
| 84 | 1010100100 | 0 | 2 | 9 | 0 | −1 | 0010100100 | 0 | 2 | 9 | 1 | −1 |
| 85 | 1011100010 | 0 | 3 | 21 | 1 | 1 | 0011100010 | 0 | 3 | 21 | 0 | 1 |
| 86 | 1011100111 | 0 | 2 | 13 | 1 | 1 | 0011100111 | 0 | 2 | 13 | 0 | 1 |
| 87 | 1011100101 | 0 | 2 | 9 | 0 | −1 | 0011100101 | 0 | 2 | 9 | 1 | −1 |
| 88 | 1011101101 | 0 | 2 | 9 | 1 | 1 | 0011101101 | 0 | 2 | 9 | 0 | 1 |
| 89 | 1011101111 | 0 | 1 | 5 | 0 | −1 | 0011101111 | 0 | 1 | 5 | 1 | −1 |
| 90 | 1011101010 | 0 | 1 | 5 | 0 | −1 | 0011101010 | 0 | 1 | 5 | 1 | −1 |
| 91 | 1011111001 | 0 | 2 | 9 | 1 | 1 | 0011111001 | 0 | 2 | 9 | 0 | 1 |
| 92 | 1011111011 | 0 | 1 | 5 | 0 | −1 | 0011111011 | 0 | 1 | 5 | 1 | −1 |
| 93 | 1011111110 | 0 | 1 | 5 | 0 | −1 | 0011111110 | 0 | 1 | 5 | 1 | −1 |
| 94 | 1011110100 | 0 | 2 | 9 | 0 | −1 | 0011110100 | 0 | 2 | 9 | 1 | −1 |
| 95 | 1011010001 | 0 | 2 | 13 | 1 | 1 | 0011010001 | 0 | 2 | 13 | 0 | 1 |
| 96 | 1011010011 | 0 | 2 | 9 | 0 | −1 | 0011010011 | 0 | 2 | 9 | 1 | −1 |
| 97 | 1011010110 | 0 | 2 | 9 | 0 | −1 | 0011010110 | 0 | 2 | 9 | 1 | −1 |
| 98 | 1011011100 | 0 | 2 | 13 | 0 | −1 | 0011011100 | 0 | 2 | 13 | 1 | −1 |
| 99 | 0010000100 | 0 | 3 | 25 | 0 | −1 | 1010000100 | 0 | 3 | 25 | 1 | −1 |
| 100 | 0010001110 | 0 | 3 | 21 | 0 | −1 | 1010001110 | 0 | 3 | 21 | 1 | −1 |
| 101 | 0010001011 | 0 | 3 | 21 | 0 | −1 | 1010001011 | 0 | 3 | 21 | 1 | −1 |
| 102 | 0010011010 | 0 | 3 | 21 | 0 | −1 | 1010011010 | 0 | 3 | 21 | 1 | −1 |
| 103 | 1001000010 | 0 | 3 | 25 | 1 | 1 | 0001000010 | 0 | 3 | 25 | 0 | 1 |
| 104 | 1001000111 | 0 | 2 | 17 | 1 | 1 | 0001000111 | 0 | 2 | 17 | 0 | 1 |
| 105 | 1001000101 | 0 | 2 | 13 | 0 | −1 | 0001000101 | 0 | 2 | 13 | 1 | −1 |
| 106 | 1001001101 | 0 | 2 | 13 | 1 | 1 | 0001001101 | 0 | 2 | 13 | 0 | 1 |
| 107 | 1001001111 | 0 | 2 | 9 | 0 | −1 | 0001001111 | 0 | 2 | 9 | 1 | −1 |
| 108 | 1001001010 | 0 | 2 | 9 | 0 | −1 | 0001001010 | 0 | 2 | 9 | 1 | −1 |
| 109 | 1001011001 | 0 | 2 | 13 | 1 | 1 | 0001011001 | 0 | 2 | 13 | 0 | 1 |
| 110 | 1001011011 | 0 | 2 | 9 | 0 | −1 | 0001011011 | 0 | 2 | 9 | 1 | −1 |
| 111 | 1001011110 | 0 | 2 | 9 | 0 | −1 | 0001011110 | 0 | 2 | 9 | 1 | −1 |
| 112 | 1001010100 | 0 | 2 | 13 | 0 | −1 | 0001010100 | 0 | 2 | 13 | 1 | −1 |
| 113 | 1001110001 | 0 | 2 | 17 | 1 | 1 | 0001110001 | 0 | 2 | 17 | 0 | 1 |
| 114 | 1001110011 | 0 | 2 | 13 | 0 | −1 | 0001110011 | 0 | 2 | 13 | 1 | −1 |
| 115 | 1001110110 | 0 | 2 | 13 | 0 | −1 | 0001110110 | 0 | 2 | 13 | 1 | −1 |
| 116 | 1001111100 | 0 | 2 | 17 | 0 | −1 | 0001111100 | 0 | 2 | 17 | 1 | −1 |
| 117 | 1100101100 | 2 | 3 | 25 | 1 | −1 | 0100101100 | −2 | 3 | 25 | 0 | −1 |
| 118 | 1100100110 | 2 | 3 | 21 | 1 | −1 | 0100100110 | −2 | 3 | 21 | 0 | −1 |
| 119 | 1100100011 | 2 | 3 | 21 | 1 | −1 | 0100100011 | −2 | 3 | 21 | 0 | −1 |
| 120 | 1100100001 | 2 | 3 | 25 | 0 | 1 | 0100100001 | −2 | 3 | 25 | 1 | 1 |
| 121 | 1101111100 | 2 | 2 | 17 | 1 | −1 | 0101111100 | −2 | 2 | 17 | 0 | −1 |
| 122 | 1101110110 | 2 | 2 | 13 | 1 | −1 | 0101110110 | −2 | 2 | 13 | 0 | −1 |
| 123 | 1101110011 | 2 | 2 | 13 | 1 | −1 | 0101110011 | −2 | 2 | 13 | 0 | −1 |
| 124 | 1101110001 | 2 | 2 | 17 | 0 | 1 | 0101110001 | −2 | 2 | 17 | 1 | 1 |
| 125 | 1101010100 | 2 | 2 | 13 | 1 | −1 | 0101010100 | −2 | 2 | 13 | 0 | −1 |
| 126 | 1101011110 | 2 | 2 | 9 | 1 | −1 | 0101011110 | −2 | 2 | 9 | 0 | −1 |
| 127 | 1101011011 | 2 | 2 | 9 | 1 | −1 | 0010101011 | −2 | 2 | 9 | 0 | −1 |
| 128 | 1101011001 | 2 | 2 | 13 | 0 | 1 | 0101011001 | −2 | 2 | 13 | 1 | 1 |
| 129 | 1101001010 | 2 | 2 | 9 | 1 | −1 | 0101001010 | −2 | 2 | 9 | 0 | −1 |
| 130 | 1101001111 | 2 | 2 | 9 | 1 | −1 | 0101001111 | −2 | 2 | 9 | 0 | −1 |
| 131 | 1101001101 | 2 | 2 | 13 | 0 | 1 | 0101001101 | −2 | 2 | 13 | 1 | 1 |
| 132 | 1101000101 | 2 | 2 | 13 | 1 | −1 | 0101000101 | −2 | 2 | 13 | 0 | −1 |
| 133 | 1101000111 | 2 | 2 | 17 | 0 | 1 | 0101000111 | −2 | 2 | 17 | 1 | 1 |
| 134 | 1101000010 | 2 | 3 | 25 | 0 | 1 | 0101000010 | −2 | 3 | 25 | 1 | 1 |
| 135 | 1111011100 | 2 | 2 | 13 | 1 | −1 | 0111011100 | −2 | 2 | 13 | 0 | −1 |
| 136 | 1111010110 | 2 | 2 | 9 | 1 | −1 | 0111010110 | −2 | 2 | 9 | 0 | −1 |
| 137 | 1111010011 | 2 | 2 | 9 | 1 | −1 | 0111010011 | −2 | 2 | 9 | 0 | −1 |
| 138 | 1111010001 | 2 | 2 | 13 | 0 | 1 | 0111010001 | −2 | 2 | 13 | 1 | 1 |
| 139 | 1111110100 | 2 | 2 | 9 | 1 | −1 | 0111110100 | −2 | 2 | 9 | 0 | −1 |
| 140 | 1111111110 | 2 | 1 | 5 | 1 | −1 | 0111111110 | −2 | 1 | 5 | 0 | −1 |

TABLE VI-continued

| | Q' = -1 | | | | | | Q' = 1 | | | | | |
|---|---|---|---|---|---|---|---|---|---|---|---|---|
| No. | CODE | DC | DSV | DV | P | Q | CODE | DC | DSV | DV | P | Q |
| 141 | 1111111011 | 2 | 1 | 5 | 1 | -1 | 0111111011 | -2 | 1 | 5 | 0 | -1 |
| 142 | 1111111001 | 2 | 2 | 9 | 0 | 1 | 0111111001 | -2 | 2 | 9 | 1 | 1 |
| 143 | 1111101010 | 2 | 1 | 5 | 1 | -1 | 0111101010 | -2 | 1 | 5 | 0 | -1 |
| 144 | 1111101111 | 2 | 1 | 5 | 1 | -1 | 0111101111 | -2 | 1 | 5 | 0 | -1 |
| 145 | 1111101101 | 2 | 2 | 9 | 0 | 1 | 0111101101 | -2 | 2 | 9 | 1 | 1 |
| 146 | 1111100101 | 2 | 2 | 9 | 1 | -1 | 0111100101 | -2 | 2 | 9 | 0 | -1 |
| 147 | 1111100111 | 2 | 2 | 13 | 0 | 1 | 0111100111 | -2 | 2 | 13 | 1 | 1 |
| 148 | 1111100010 | 2 | 3 | 21 | 0 | 1 | 0111100010 | -2 | 3 | 21 | 1 | 1 |
| 149 | 1110100100 | 2 | 2 | 9 | 1 | -1 | 0110100100 | -2 | 2 | 9 | 0 | -1 |
| 150 | 1110101110 | 2 | 1 | 5 | 1 | -1 | 0110101110 | -2 | 1 | 5 | 0 | -1 |
| 151 | 1110101011 | 2 | 1 | 5 | 1 | -1 | 0110101011 | -2 | 1 | 5 | 0 | -1 |
| 152 | 1110101001 | 2 | 2 | 9 | 0 | 1 | 0110101001 | -2 | 2 | 9 | 1 | 1 |
| 153 | 1110111010 | 2 | 1 | 5 | 1 | -1 | 0110111010 | -2 | 1 | 5 | 0 | -1 |
| 154 | 1110111111 | 2 | 1 | 5 | 1 | -1 | 0110111111 | -2 | 1 | 5 | 0 | -1 |
| 155 | 1110111101 | 2 | 2 | 9 | 0 | 1 | 0110111101 | -2 | 2 | 9 | 1 | 1 |
| 156 | 1110110101 | 2 | 2 | 9 | 1 | -1 | 0110110101 | -2 | 2 | 9 | 0 | -1 |
| 157 | 1110110111 | 2 | 2 | 13 | 0 | 1 | 0110110111 | -2 | 2 | 13 | 1 | 1 |
| 158 | 1110110010 | 2 | 3 | 21 | 0 | 1 | 0110110010 | -2 | 3 | 21 | 1 | 1 |
| 159 | 1110010010 | 2 | 2 | 9 | 1 | -1 | 0110010010 | -2 | 2 | 9 | 0 | -1 |
| 160 | 1110010111 | 2 | 2 | 9 | 1 | -1 | 0110010111 | -2 | 2 | 9 | 0 | -1 |
| 161 | 1110010101 | 2 | 2 | 13 | 0 | 1 | 0110010101 | -2 | 2 | 13 | 1 | 1 |
| 162 | 1110011101 | 2 | 2 | 13 | 1 | -1 | 0110011101 | -2 | 2 | 13 | 0 | -1 |
| 163 | 1110011111 | 2 | 2 | 17 | 0 | 1 | 0110011111 | -2 | 2 | 17 | 1 | 1 |
| 164 | 1110011010 | 2 | 3 | 25 | 0 | 1 | 0110011010 | -2 | 3 | 25 | 1 | 1 |
| 165 | 1110001001 | 2 | 3 | 21 | 1 | -1 | 0110001001 | -2 | 3 | 21 | 0 | -1 |
| 166 | 1110001011 | 2 | 3 | 25 | 0 | 1 | 0110001011 | -2 | 3 | 25 | 1 | 1 |
| 167 | 1110001110 | 2 | 3 | 33 | 0 | 1 | 0110001110 | -2 | 3 | 33 | 1 | 1 |
| 168 | 1010011100 | 2 | 2 | 13 | 1 | -1 | 0010011100 | -2 | 2 | 13 | 0 | -1 |
| 169 | 1010010110 | 2 | 2 | 9 | 1 | -1 | 0010010110 | -2 | 2 | 9 | 0 | -1 |
| 170 | 1010010011 | 2 | 2 | 9 | 1 | -1 | 0010010011 | -2 | 2 | 9 | 0 | -1 |
| 171 | 1010010001 | 2 | 2 | 13 | 0 | 1 | 0010010001 | -2 | 2 | 13 | 1 | 1 |
| 172 | 1010110100 | 2 | 2 | 9 | 1 | -1 | 0010110100 | -2 | 2 | 9 | 0 | -1 |
| 173 | 1010111110 | 2 | 1 | 5 | 1 | -1 | 0010111110 | -2 | 1 | 5 | 0 | -1 |
| 174 | 1010111011 | 2 | 1 | 5 | 1 | -1 | 0010111011 | -2 | 1 | 5 | 0 | -1 |
| 175 | 1010111001 | 2 | 2 | 9 | 0 | 1 | 0010111001 | -2 | 2 | 9 | 1 | 1 |
| 176 | 1010101010 | 2 | 1 | 5 | 1 | -1 | 0010101010 | -2 | 1 | 5 | 0 | -1 |
| 177 | 1010101111 | 2 | 1 | 5 | 1 | -1 | 0010101111 | -2 | 1 | 5 | 0 | -1 |
| 178 | 1010101101 | 2 | 2 | 9 | 0 | 1 | 0010101101 | -2 | 2 | 9 | 1 | 1 |
| 179 | 1010100101 | 2 | 2 | 9 | 1 | -1 | 0010100101 | -2 | 2 | 9 | 0 | -1 |
| 180 | 1010100111 | 2 | 2 | 13 | 0 | 1 | 0010100111 | -2 | 2 | 13 | 1 | 1 |
| 181 | 1010100010 | 2 | 3 | 21 | 0 | 1 | 0010100010 | -2 | 3 | 21 | 1 | 1 |
| 182 | 1011100100 | 2 | 2 | 9 | 1 | -1 | 0011100100 | -2 | 2 | 9 | 0 | -1 |
| 183 | 1011101110 | 2 | 1 | 5 | 1 | -1 | 0011101110 | -2 | 1 | 5 | 0 | -1 |
| 184 | 1011101011 | 2 | 1 | 5 | 1 | -1 | 0011101011 | -2 | 1 | 5 | 0 | -1 |
| 185 | 1011101001 | 2 | 2 | 9 | 0 | 1 | 0011101001 | -2 | 2 | 9 | 1 | 1 |
| 186 | 1011111010 | 2 | 1 | 5 | 1 | -1 | 0011111010 | -2 | 1 | 5 | 0 | -1 |
| 187 | 1011111111 | 2 | 1 | 5 | 1 | -1 | 0011111111 | -2 | 1 | 5 | 0 | -1 |
| 188 | 1011111101 | 2 | 2 | 9 | 0 | 1 | 0011111101 | -2 | 2 | 9 | 1 | 1 |
| 189 | 1011110101 | 2 | 2 | 9 | 1 | -1 | 0011110101 | -2 | 2 | 9 | 0 | -1 |
| 190 | 1011110111 | 2 | 2 | 13 | 0 | 1 | 0011110111 | -2 | 2 | 13 | 1 | 1 |
| 191 | 1011110010 | 2 | 3 | 21 | 0 | 1 | 0011110010 | -2 | 3 | 21 | 1 | 1 |
| 192 | 1011010010 | 2 | 2 | 9 | 1 | -1 | 0011010010 | -2 | 2 | 9 | 0 | -1 |
| 193 | 1011010111 | 2 | 2 | 9 | 1 | -1 | 0011010111 | -2 | 2 | 9 | 0 | -1 |
| 194 | 1011010101 | 2 | 2 | 13 | 0 | 1 | 0011010101 | -2 | 2 | 13 | 1 | 1 |
| 195 | 1011011101 | 2 | 2 | 13 | 1 | -1 | 0011011101 | -2 | 2 | 13 | 0 | -1 |
| 196 | 1011011111 | 2 | 2 | 17 | 0 | 1 | 0011011111 | -2 | 2 | 17 | 1 | 1 |
| 197 | 1011011010 | 2 | 3 | 25 | 0 | 1 | 0011011010 | -2 | 3 | 25 | 1 | 1 |
| 198 | 1011001001 | 2 | 3 | 21 | 1 | -1 | 0011001001 | -2 | 3 | 21 | 0 | -1 |
| 199 | 1011001011 | 2 | 3 | 25 | 0 | 1 | 0011001011 | -2 | 3 | 25 | 1 | 1 |
| 200 | 1011001110 | 2 | 3 | 33 | 0 | 1 | 0011001110 | -2 | 3 | 33 | 1 | 1 |
| 201 | 1001000100 | 2 | 2 | 13 | 1 | -1 | 0001000100 | -2 | 2 | 13 | 0 | -1 |
| 202 | 1001001110 | 2 | 2 | 9 | 1 | -1 | 0001001110 | -2 | 2 | 9 | 0 | -1 |
| 203 | 1001001011 | 2 | 2 | 9 | 1 | -1 | 0001001011 | -2 | 2 | 9 | 0 | -1 |
| 204 | 1001001001 | 2 | 2 | 13 | 0 | 1 | 0001001001 | -2 | 2 | 13 | 1 | 1 |
| 205 | 1001011010 | 2 | 2 | 9 | 1 | -1 | 0001011010 | -2 | 2 | 9 | 0 | -1 |
| 206 | 1001011111 | 2 | 2 | 9 | 1 | -1 | 0001011111 | -2 | 2 | 9 | 0 | -1 |
| 207 | 1001001101 | 2 | 2 | 13 | 1 | 1 | 0001011101 | -2 | 2 | 13 | 0 | -1 |
| 208 | 1001010101 | 2 | 2 | 13 | 1 | -1 | 0001010101 | -2 | 2 | 13 | 0 | -1 |
| 209 | 1001010111 | 2 | 2 | 17 | 0 | 1 | 0001010111 | -2 | 2 | 17 | 1 | 1 |
| 210 | 1001010010 | 2 | 3 | 25 | 0 | 1 | 0001010010 | -2 | 3 | 25 | 1 | 1 |
| 211 | 1001110010 | 2 | 2 | 13 | 1 | -1 | 0001110010 | -2 | 2 | 13 | 0 | -1 |
| 212 | 1001110111 | 2 | 2 | 13 | 1 | -1 | 0001110111 | -2 | 2 | 13 | 0 | -1 |
| 213 | 1001110101 | 2 | 2 | 17 | 0 | 1 | 0001110101 | -2 | 2 | 17 | 1 | 1 |
| 214 | 1001111101 | 2 | 2 | 17 | 1 | -1 | 0001111101 | -2 | 2 | 17 | 0 | -1 |
| 215 | 1001111111 | 2 | 2 | 21 | 0 | 1 | 0001111111 | -2 | 2 | 21 | 1 | 1 |
| 216 | 1001111010 | 2 | 3 | 29 | 0 | 1 | 0001111010 | -2 | 3 | 29 | 1 | 1 |
| 217 | 1001101001 | 2 | 3 | 25 | 1 | -1 | 0001101001 | -2 | 3 | 25 | 0 | -1 |
| 218 | 1001101011 | 2 | 3 | 29 | 0 | 1 | 0001101011 | -2 | 3 | 29 | 1 | 1 |
| 219 | 1001101110 | 2 | 3 | 37 | 0 | 1 | 0001101110 | -2 | 3 | 37 | 1 | 1 |
| 220 | 0100001110 | 2 | 3 | 37 | 0 | 1 | 1100001110 | -2 | 3 | 37 | 1 | 1 |

TABLE VI-continued

| No. | Q' = -1 CODE | DC | DSV | DV | P | Q | Q' = 1 CODE | DC | DSV | DV | P | Q |
|---|---|---|---|---|---|---|---|---|---|---|---|---|
| 221 | 0100001011 | 2 | 3 | 29 | 0 | 1 | 1100001011 | -2 | 3 | 29 | 1 | 1 |
| 222 | 0100001001 | 2 | 3 | 25 | 1 | -1 | 1100001001 | -2 | 3 | 25 | 0 | -1 |
| 223 | 0100011010 | 2 | 3 | 29 | 0 | 1 | 1100011010 | -2 | 3 | 29 | 1 | 1 |
| 224 | 0100011111 | 2 | 2 | 21 | 0 | 1 | 1100011111 | -2 | 2 | 21 | 1 | 1 |
| 225 | 0100011101 | 2 | 2 | 17 | 1 | -1 | 1100011101 | -2 | 2 | 17 | 0 | -1 |
| 226 | 0100010101 | 2 | 2 | 17 | 0 | 1 | 1100010101 | -2 | 2 | 17 | 1 | 1 |
| 227 | 0100010111 | 2 | 2 | 13 | 1 | -1 | 1100010111 | -2 | 2 | 13 | 0 | -1 |
| 228 | 0100010010 | 2 | 2 | 13 | 1 | -1 | 1100010010 | -2 | 2 | 13 | 0 | -1 |
| 229 | 0100110010 | 2 | 3 | 25 | 0 | 1 | 1100110010 | -2 | 3 | 25 | 1 | 1 |
| 230 | 0100110111 | 2 | 2 | 17 | 0 | 1 | 1100110111 | -2 | 2 | 17 | 1 | 1 |
| 231 | 0100110101 | 2 | 2 | 13 | 1 | -1 | 1100110101 | -2 | 2 | 13 | 0 | -1 |
| 232 | 0100111101 | 2 | 2 | 13 | 0 | 1 | 1100111101 | -2 | 2 | 13 | 1 | 1 |
| 233 | 0100111111 | 2 | 2 | 9 | 1 | -1 | 1100111111 | -2 | 2 | 9 | 0 | -1 |
| 234 | 0100111010 | 2 | 2 | 9 | 1 | -1 | 1100111010 | -2 | 2 | 9 | 0 | -1 |
| 235 | 0100101001 | 2 | 2 | 13 | 0 | 1 | 1100101001 | -2 | 2 | 13 | 1 | 1 |
| 236 | 0100101011 | 2 | 2 | 9 | 1 | -1 | 1100101011 | -2 | 2 | 9 | 0 | -1 |
| 237 | 0100101110 | 2 | 2 | 9 | 1 | -1 | 1100101110 | -2 | 2 | 9 | 0 | -1 |
| 238 | 0100100100 | 2 | 2 | 13 | 1 | -1 | 1100100100 | -2 | 2 | 13 | 0 | -1 |
| 239 | 0101100010 | 2 | 3 | 25 | 0 | 1 | 1101100010 | -2 | 3 | 25 | 1 | 1 |
| 240 | 0101100111 | 2 | 2 | 17 | 0 | 1 | 1101100111 | -2 | 2 | 17 | 1 | 1 |
| 241 | 0101100101 | 2 | 2 | 13 | 1 | -1 | 1101100101 | -2 | 2 | 13 | 0 | -1 |
| 242 | 0101101101 | 2 | 2 | 13 | 0 | 1 | 1101101101 | -2 | 2 | 13 | 1 | 1 |
| 243 | 0101101111 | 2 | 2 | 9 | 1 | -1 | 1101101111 | -2 | 2 | 9 | 0 | -1 |
| 244 | 0101101010 | 2 | 2 | 9 | 1 | -1 | 1101101010 | -2 | 2 | 9 | 0 | -1 |
| 245 | 0101111001 | 2 | 2 | 13 | 0 | 1 | 1101111001 | -2 | 2 | 13 | 1 | 1 |
| 246 | 0101111011 | 2 | 2 | 9 | 1 | -1 | 1101111011 | -2 | 2 | 9 | 0 | -1 |
| 247 | 0101111110 | 2 | 2 | 9 | 1 | -1 | 1101111110 | -2 | 2 | 9 | 0 | -1 |
| 248 | 0101110100 | 2 | 2 | 13 | 1 | -1 | 1101110100 | -2 | 2 | 13 | 0 | -1 |
| 249 | 0101010001 | 2 | 2 | 17 | 0 | 1 | 1101010001 | -2 | 2 | 17 | 1 | 1 |
| 250 | 0101010011 | 2 | 2 | 13 | 1 | -1 | 1101010011 | -2 | 2 | 13 | 0 | -1 |
| 251 | 0101010110 | 2 | 2 | 13 | 1 | -1 | 1101010110 | -2 | 2 | 13 | 0 | -1 |
| 252 | 0101011100 | 2 | 2 | 17 | 1 | 1 | 1101011100 | -2 | 2 | 17 | 0 | -1 |
| 253 | 0111000010 | 2 | 3 | 29 | 0 | 1 | 1111000010 | -2 | 3 | 29 | 1 | 1 |
| 254 | 0111000111 | 2 | 2 | 21 | 0 | 1 | 1111000111 | -2 | 2 | 21 | 1 | 1 |
| 255 | 0111000101 | 2 | 2 | 17 | 1 | -1 | 1111000101 | -2 | 2 | 17 | 0 | -1 |
| 256 | 0111001101 | 2 | 2 | 17 | 0 | 1 | 1111001101 | -2 | 2 | 17 | 1 | 1 |
| 257 | 0111001111 | 2 | 2 | 13 | 1 | -1 | 1111001111 | -2 | 2 | 13 | 0 | -1 |
| 258 | 0111001010 | 2 | 2 | 13 | 1 | -1 | 1111001010 | -2 | 2 | 13 | 0 | -1 |
| 259 | 0111011001 | 2 | 2 | 17 | 0 | 1 | 1111011001 | -2 | 2 | 17 | 1 | 1 |
| 260 | 0111011011 | 2 | 2 | 13 | 1 | -1 | 1111011011 | -2 | 2 | 13 | 0 | -1 |
| 261 | 0111011110 | 2 | 2 | 13 | 1 | -1 | 1111011110 | -2 | 2 | 13 | 0 | -1 |
| 262 | 0111010100 | 2 | 2 | 17 | 1 | -1 | 1111010100 | -2 | 2 | 17 | 0 | -1 |
| 263 | 0111110001 | 2 | 2 | 21 | 0 | 1 | 1111110001 | -2 | 2 | 21 | 1 | 1 |
| 264 | 0111110011 | 2 | 2 | 17 | 1 | -1 | 1111110011 | -2 | 2 | 17 | 0 | -1 |
| 265 | 0111110110 | 2 | 2 | 17 | 1 | -1 | 1111110110 | -2 | 2 | 17 | 0 | -1 |
| 266 | 0111111100 | 2 | 2 | 21 | 1 | -1 | 1111111100 | -2 | 2 | 21 | 0 | -1 |
| 267 | 0110100001 | 2 | 3 | 29 | 0 | 1 | 1110100001 | -2 | 3 | 29 | 1 | 1 |
| 268 | 0110100011 | 2 | 3 | 25 | 1 | -1 | 1110100011 | -2 | 3 | 25 | 0 | -1 |
| 269 | 0110100110 | 2 | 3 | 25 | 1 | -1 | 1110100110 | -2 | 3 | 25 | 0 | -1 |
| 270 | 0110101100 | 2 | 3 | 29 | 1 | -1 | 1110101100 | -2 | 3 | 29 | 0 | -1 |
| 271 | 0010000111 | 2 | 3 | 29 | 0 | 1 | 1010000111 | -2 | 3 | 29 | 1 | 1 |
| 272 | 0010000101 | 2 | 3 | 25 | 1 | -1 | 1010000101 | -2 | 3 | 25 | 0 | -1 |
| 273 | 0010001101 | 2 | 3 | 25 | 0 | 1 | 1010001101 | -2 | 3 | 25 | 1 | 1 |
| 274 | 0010001111 | 2 | 3 | 21 | 1 | -1 | 1010001111 | -2 | 3 | 21 | 0 | -1 |
| 275 | 0010001010 | 2 | 3 | 21 | 1 | -1 | 1010001010 | -2 | 3 | 21 | 0 | -1 |
| 276 | 0010011001 | 2 | 3 | 25 | 0 | 1 | 1010011001 | -2 | 3 | 25 | 1 | 1 |
| 277 | 0010011011 | 2 | 3 | 21 | 1 | -1 | 1010011011 | -2 | 3 | 21 | 0 | -1 |
| 278 | 0010011110 | 2 | 3 | 21 | 1 | -1 | 1010011110 | -2 | 3 | 21 | 0 | -1 |
| 279 | 0010010100 | 2 | 3 | 25 | 1 | -1 | 1010010100 | -2 | 3 | 25 | 0 | -1 |
| 280 | 0010110001 | 2 | 3 | 29 | 0 | 1 | 1010110001 | -2 | 3 | 29 | 1 | 1 |
| 281 | 0010110011 | 2 | 3 | 25 | 1 | -1 | 1010110011 | -2 | 3 | 25 | 0 | -1 |
| 282 | 0010110110 | 2 | 3 | 25 | 1 | -1 | 1010110110 | -2 | 3 | 25 | 0 | -1 |
| 283 | 0010111100 | 2 | 3 | 29 | 1 | -1 | 1010111100 | -2 | 3 | 29 | 0 | -1 |
| 284 | 0011100001 | 2 | 3 | 37 | 0 | 1 | 1011100001 | -2 | 3 | 37 | 1 | 1 |
| 285 | 0011100011 | 2 | 3 | 33 | 1 | -1 | 1011100011 | -2 | 3 | 33 | 0 | -1 |
| 286 | 0011100110 | 2 | 3 | 33 | 1 | 1 | 1011100110 | -2 | 3 | 33 | 0 | -1 |
| 287 | 0011101100 | 2 | 3 | 37 | 1 | -1 | 1011101100 | -2 | 3 | 37 | 0 | -1 |

When 256 10-bit combinations or code words suitable for correspondence to 8 bit data or information words are being selected from the 287 possible combinations on Table VI, it is sufficient to select the same with consideration of the ease of conversion, for example, it is desirable to select a 10-bit code word or combination having a first bit of the same polarity as that of the first bit of the corresponding 8-bit information word, or to select a code word or combination in which variance (DV) of DSV is small and so on.

In Table VI, the combinations or codes of NOs. 103 to 116 and NOs. 201 to 219 which begin with "0001 . . ." are usable only when Q'=1 is satisfied, or DSV is +1.

Figure 5:
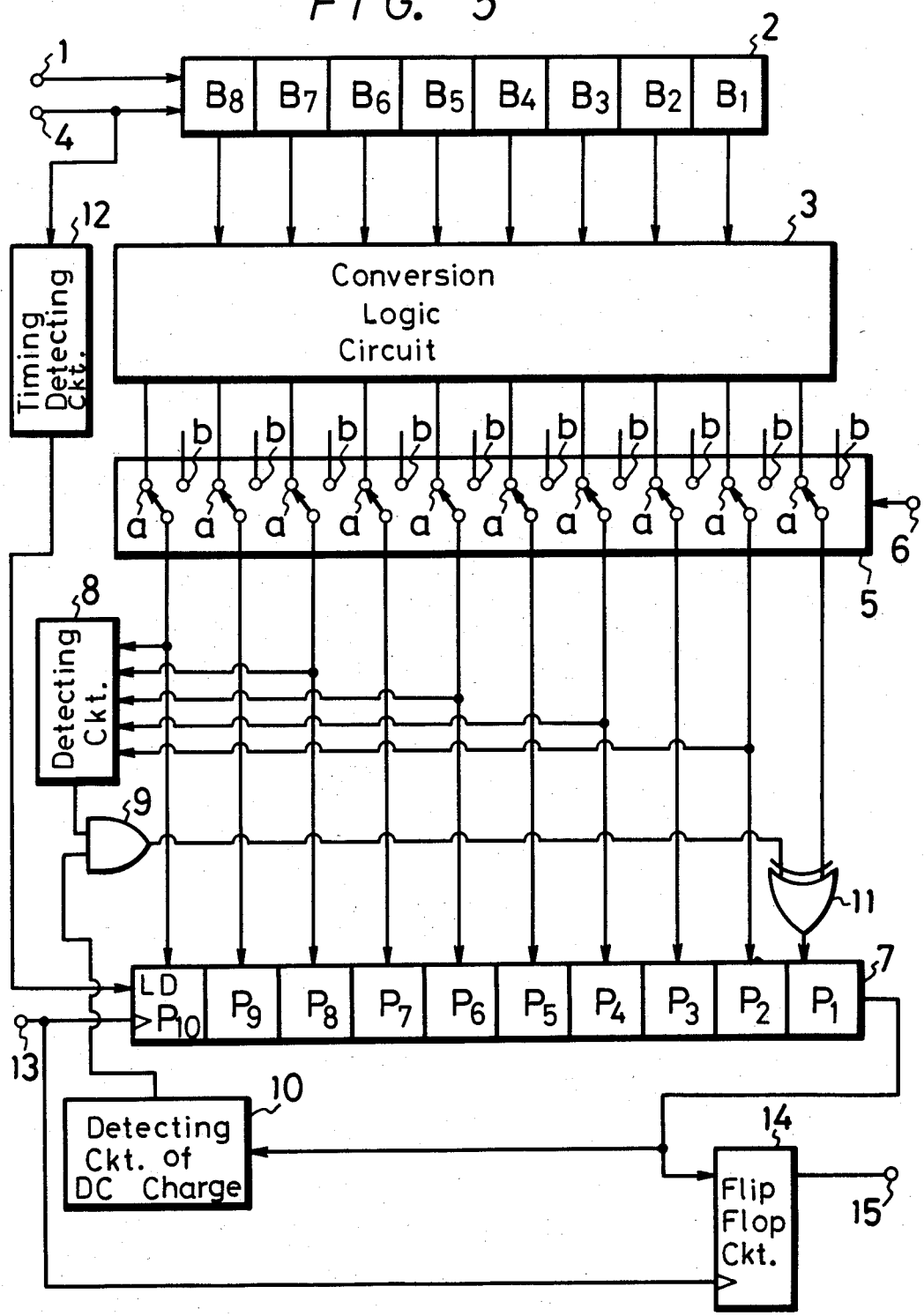
FIG. 5 schematically illustrates an apparatus for generating an n-bit NRZI-coded converted digital signal from an m-bit base digital signal.
Figure 8:
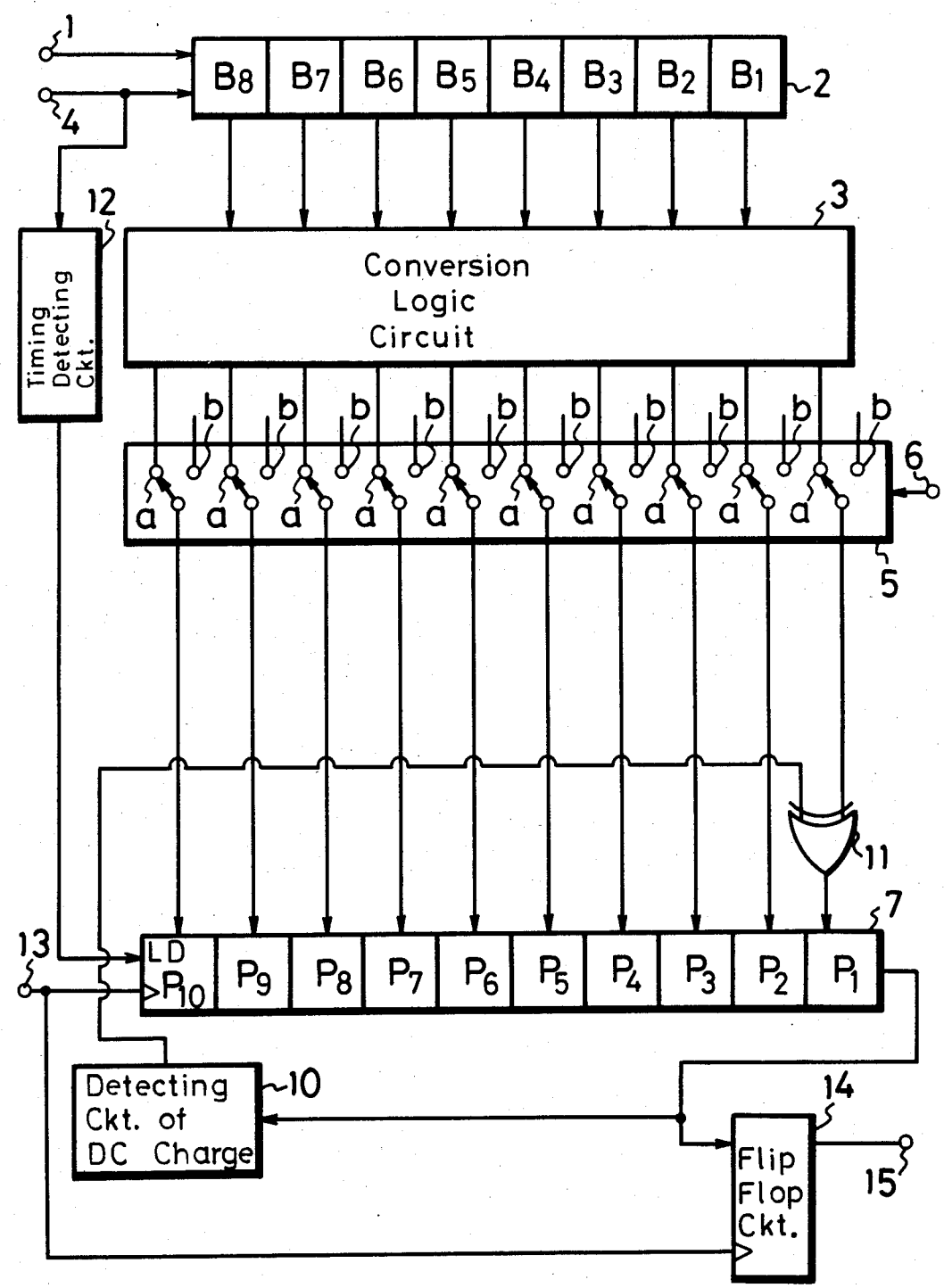
FIG. 8 schematically illustrates an apparatus for generating an n-bit NRZI-coded converted digital signal from an m-bit base digital signal in accordance with one embodiment of the present invention.

FIG. 8 illustrates an example of an apparatus for carrying out the conversion in accordance with the method of this invention. In FIG. 8, like parts corresponding to those in FIG. 5 are marked with the same references and will not be described in detail.

In accordance with this invention, upon conversion, the first bit of all code words or combinations is made variable so that the converting apparatus shown in FIG. 8 does not require a detecting circuit which detects whether the first bit is variable or fixed. In other words the detecting or controlling circuit 8 of FIG. 5 for detecting a code word or combination with zero DC component (the first bit is fixed) and a code word or combination with +2 DC component (the first bit is variable) is not required according to this invention.

In the embodiment of FIG. 8, the output of the detecting circuit 10 for detecting digital sum variation (DSV) is directly supplied to one input terminal of the EOR circuit 11 which, at its other input terminal 1 receives the first bit from circuit 5. All other circuit arrangements are the same as those in FIG. 5.

The output of the conversion logic circuit 3 must be selected to be a code word or combination having such a first bit that the DSV thereof up to that time is either $-1$ or $+1$. Accordingly, if the output of the conversion logic circuit 3 is selected, for example, to be a code word with $DSV = +1$, when the DSV of a converted code word or combination being output from shift register 7 begins with $-1$, the high level output from the detecting circuit 10 is supplied to the EOR circuit 11, and, accordingly, the first bit of such output from conversion logic circuit 3 is inverted in polarity when being fed to the shift register 7.

Similarly to the above, the content of this shift register 7 is read out on the basis of the clock signal supplied thereto from the clock terminal 13, fed to the flip-flop circuit 14 and then developed at the output terminal 15 as the NRZI-coded signal.

As described above, without using the detecting circuit 8 (and the AND circuit 9) of FIG. 5, it is possible to carry out the 8/10-conversion by this invention.

Figure 6:
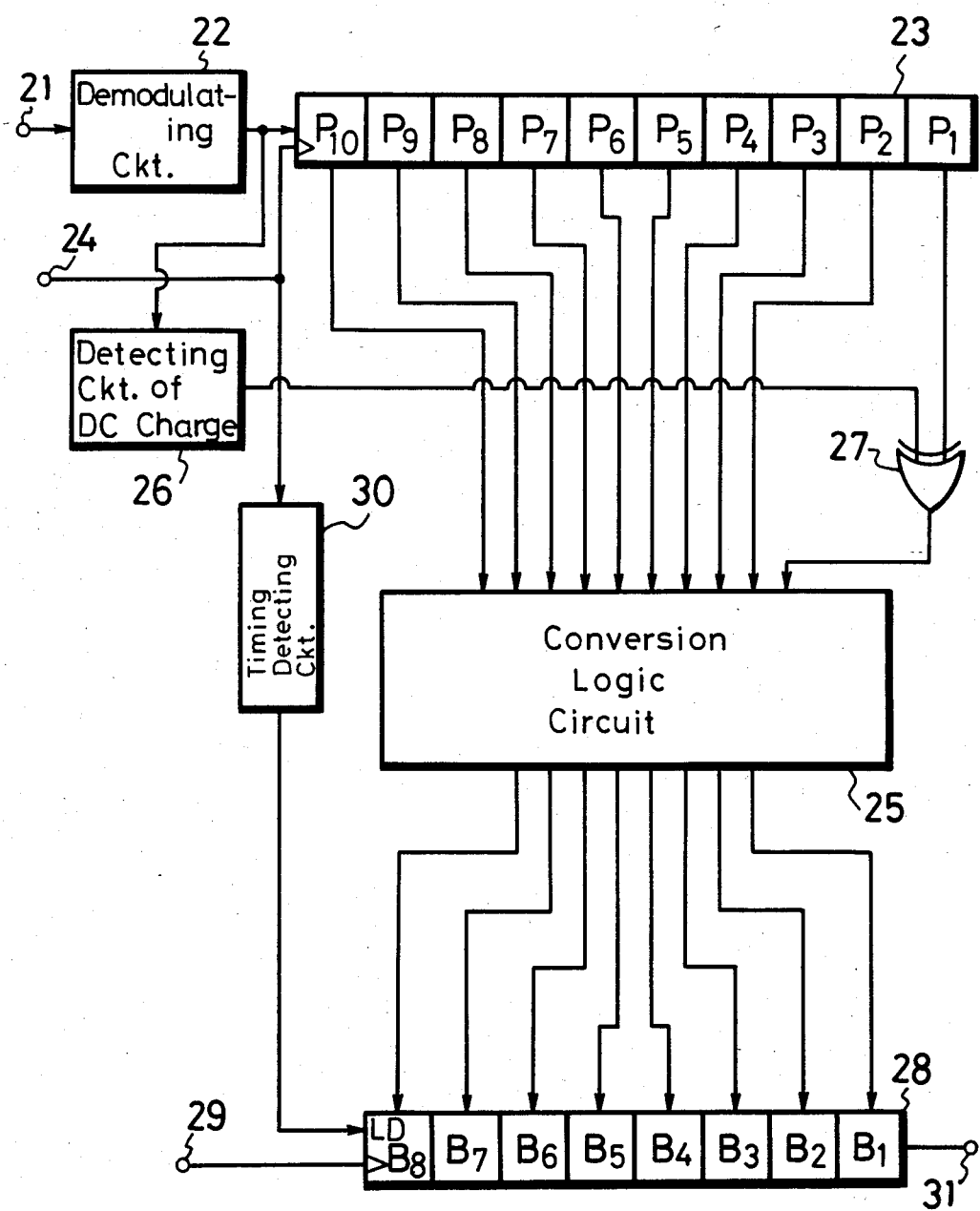
FIG. 6 schematically illustrates an apparatus for restoring an m-bit base digital signal from the n-bit NRZI-coded converted digital signal.
Figure 9:
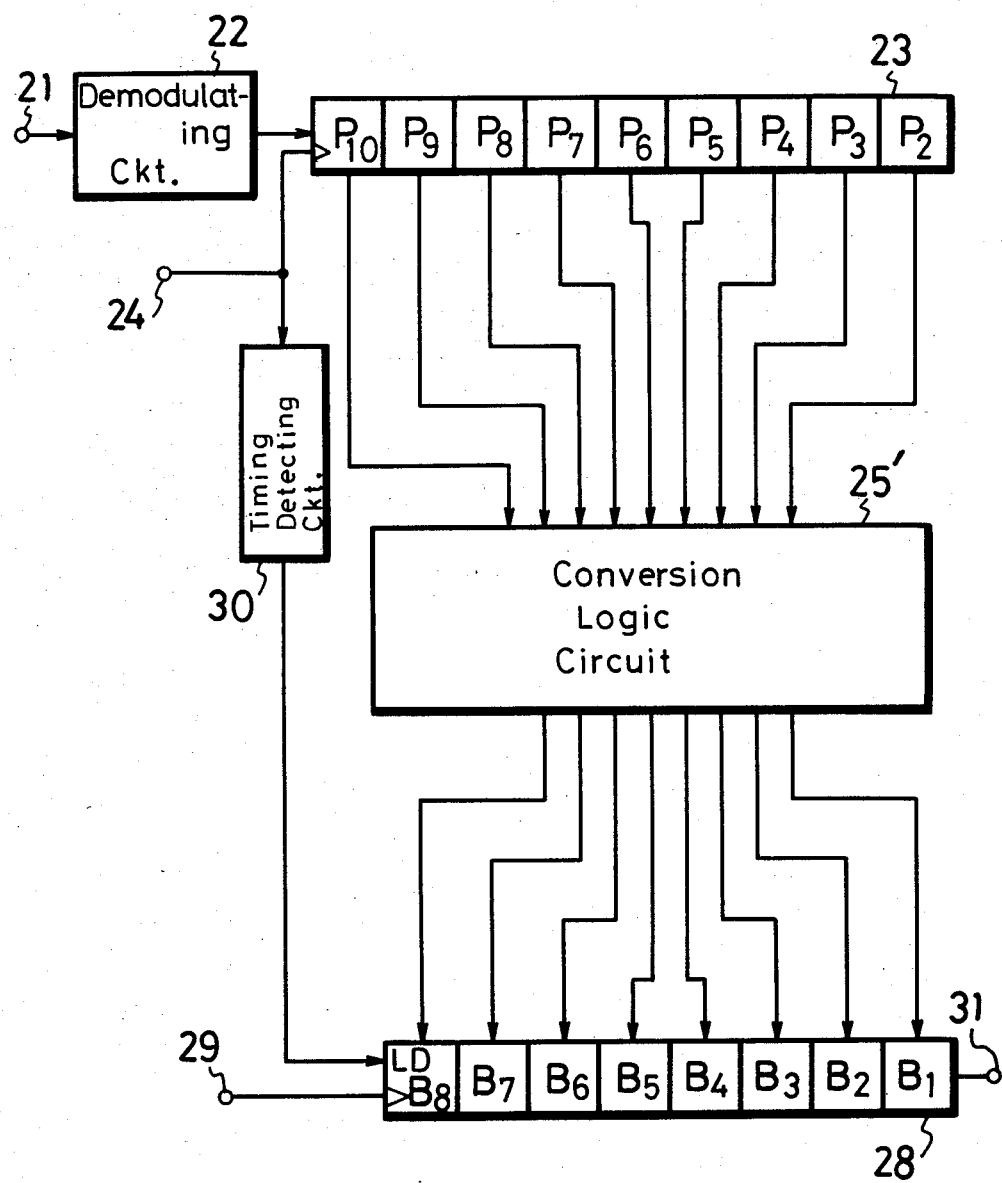
FIG. 9 schematically illustrates an apparatus for restoring an m-bit base ditital signal from the n-bit NRZI-coded converted digital signal which is generated in accordance with the present invention.

FIG. 9 illustrates an example of a demodulating apparatus in accordance with the invention. In FIG. 9, like parts corresponding to those in FIG. 6 are marked with the same references and will not be described in detail.

As earlier noted, in accordance with this invention, upon conversion, the first bit of all code words or combinations is made variable, and, upon demodulation or reverse conversion, this variable first bit is merely used to enhance the DC property and is not directly related to data words so only the 9 bits other than the first bit of the 10-bit code word are supplied from the shift register 23 to a conversion logic circuit 25'. Accordingly, in this case, this conversion logic circuit 25' does not effect the 10/8-conversion but may merely effect a 9/8-conversion, so that the circuit arrangement thereof may be further simplified. Further, the detecting circuit 26 and the EOR circuit 27 used in FIG. 6 becomes unnecessary in the circuit of FIG. 9.

Figure 10A:
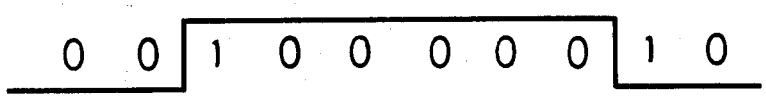
FIGS. 10A, 10B and FIGS. 11A, 11B respectively illustrate an example of a synchronizing pattern and a variance of DSV thereof used in accordance with the present invention.
Figure 10B:
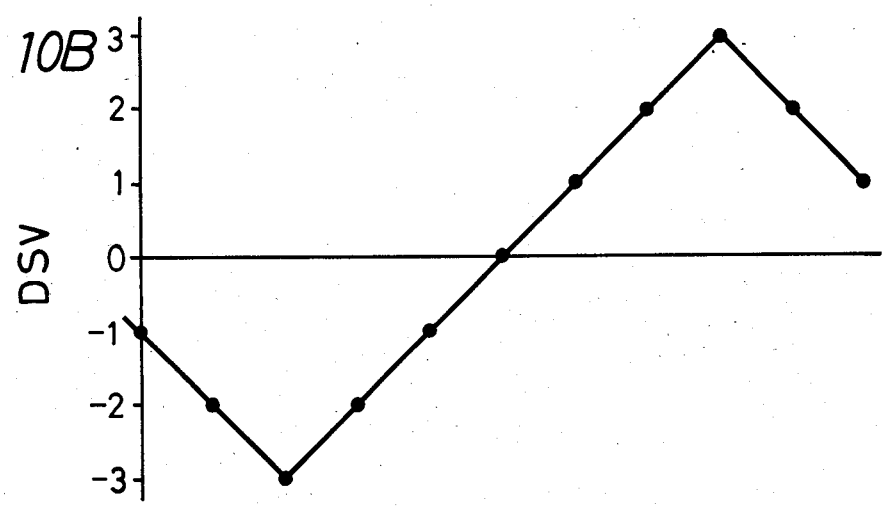
Figure 11A:
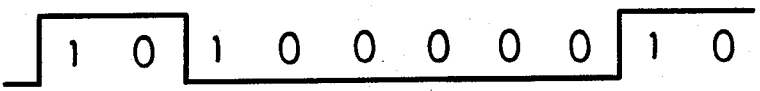
Figure 11B:
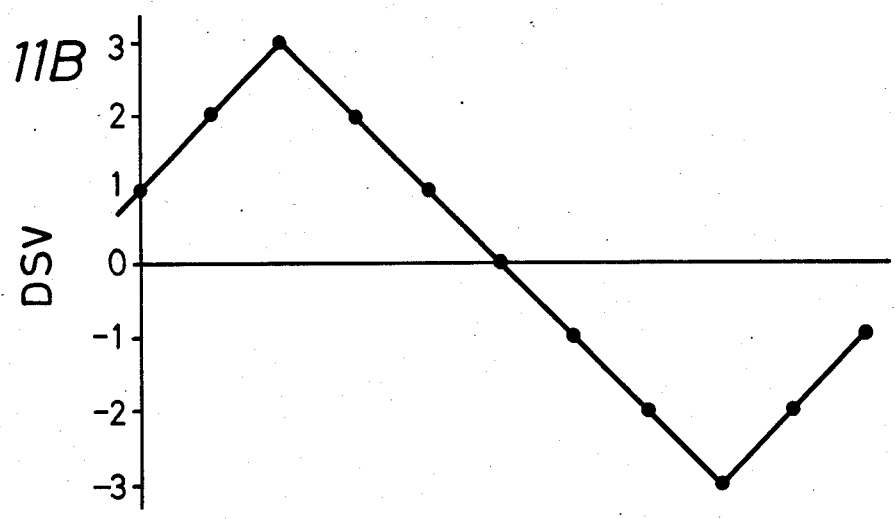

FIGS. 10A, 10B and FIGS. 11A, 11B respectively illustrate an example of a sync pattern used in the discribed embodiment of the invention. The sync pattern shown in FIGS. 10A and 10B is used when $DSV = -1$ is established, while the sync pattern shown in FIGS. 11A and 11B is used when $DSV = +1$ is established. One or the other sync pattern is inserted as the combination applied to the contacts b of the data/sync selection circuit 5 and which can not be realized in the ordinary conversion by circuit 3. Such sync patterns can be detected to permit the code words to be divided into 10 bits each upon demodulation. In this embodiment, sync patterns with $Tmax = 6T'$ as shown in FIGS. 10A, 10B and FIGS. 11A, 11B are used. Although the patterns with $Tmax = 6T'$ may have many different waveforms under the condition of $|DSV| \geq 3$ as mentioned above, only the patterns shown in FIGS. 10A, 10B and FIGS. 11A, 11B can be realized. For example, when the output of the conversion logic circuit 3 is selected to be a code word or combination having such a first bit that $DSV = +1$ (namely, $DC = -2$) is established and then delivered, the sync pattern shown in FIGS. 11A, 11B is set at the contacts b of the selector 5 in FIG. 8.

Although, in the described embodiment, 8bit information words are converted to 10-bit code words this invention is not limited to such case but can similarly be applied to other cases in which m bit information is converted to n bit information, with n being greater than m.

As set forth above, according to this invention, when m bit information is converted to n bit information, in which n is greater than m, all the first bits of the respective combinations or code words of converted n bit information which are made to correspond one by one to m bit information words are made variable. Further, in accordance with the invention, in the signal after being modulated, a predetermined number of consecutive bits at the same level are permitted. For example, 5 bits (up to four consecutive digital zeroes) are permitted in the case of 8/10 conversion and either one or the other of paired code words or combinations is selected on the basis of DSV up to that time. Thus, the DSV variance becomes small and the low frequency component can be reduced so that the bit error ratio can be improved and the high density recording and transmission become possible. Further, upon conversion, each first bit of all the combinations is made variable so that a circuit for detecting whether the first bit is variable or not becomes unnecessary. Furthermore, reverse-conversion can be carried out without reference to the first bit so that the conversion logic circuit can be simplified.

Although a single preferred embodiment of the invention has been described in detail it will be apparent that the invention is not limited thereto, and that many modifications and variations could be effected by one skilled in the art without departing from the spirit or scope of the invention as defined by the appended claims.

We claim as our invention:

1. A method for providing a digital signal having at least two signal levels, a DC component substantially equal to zero and a predetermined maximum time between level transitions, said method comprising the steps of: dividing a base digital signal into a series of base words, each word having m bits of data; converting said base digital signal into a converted digital signal by matching said base words with corresponding converted words, each of said converted words having n bits of data, wherein n is greater than m and said converted digital signal has a predetermined maximum number of consecutive digital zeroes, said converted words including a plurality of paired primary combinations of n bits having a DC component substantially equal to zero when NRZI (non-return to zero, inverted)-coded and a plurality of secondary combinations of n bits having a DC component with an absolute value of two when NRZI-coded, each pair of said primary combinations being comprised of two complementary combinations which differ in variance of DSV when NRZI-coded and which both correspond to a respective one of said base words, and, in each instance when the base word being converted corresponds to a pair of said primary combinations, selecting the one of said primary combinations of said corresponding pair which decreases said DSV of the converted digital signal when NRZI-coded; and generating said converted signal as an NRZI-coded digital signal.

2. A method as in claim 1, wherein m is eight, n is ten and said converted signal has a maximum of four consecutive digital zeroes.

3. A method as in claim 2, wherein said digital signals are bi-level signals, each of said primary combinations begins with a maximum of three digital zeroes, ends with a maximum of two digital zeroes and has a maximum of four consecutive digital zeroes anywhere therein, and each of said secondary combinations begins with a maximum of three digital zeroes, ends with a maximum of two digital zeroes and has a maximum of four consecutive digital zeroes anywhere therein.

4. A method as in claim 2, wherein said two complementary combinations of each said pair of primary combinations differ only in the first bit of data thereof, and said secondary combinations are also paired with each pair of said secondary combinations corresponding to a respective one of said base words and differing only in the first bit of data thereof, the method further comprising the steps of: generating a control signal in response to a DSV at the exit of a preceding converted word in said converted signal; and inverting the first bit of data comprising the next primary or secondary combination in response to said control signal.

5. A method as in claim 2, wherein said secondary combinations are also paired with each pair of said secondary combinations being comprised of two complementary combinations which differ in polarity of said DC component and which both correspond to a respective one of said base words, and wherein, in each instance where the base word being converted corresponds to a pair of said secondary combinations, the one of said corresponding pair of secondary combinations is selected which has the polarity of its DC component decreasing said DSV of the converted digital signal when NRZI-coded.

6. A method for encoding and decoding a digital signal having at least two signal levels, a DC component substantially equal to zero and a predetermined maximum time between level transitions, said method including an encoding sequence comprising the steps of: dividing a base digital signal into a series of base words, each word having m bits of data; converting said base digital signal into a converted digital signal by matching said base words with corresponding converted words, each of said converted words having n bits of data, wherein n is greater than m and said converted digital signal has a predetermined maximum number of consecutive digital zeroes, said converted words including a plurality of paired primary combinations of n bits having a DC component substantially equal to zero when NRZI (non-return to zero, inverted)-coded and a plurality of secondary combinations of n bits having a DC component with an absolute value of two when NRZI-coded, each pair of said primary combinations being comprised of two complementary combinations which differ in variance of DSV when NRZI coded and which both correspond to a respective one of said base words, and, in each instance when the base word being converted corresponds to a pair of said primary combinations, selecting the one of said primary combinations of said corresponding pair which decreases said DSV of the converted digital signal when NRZI-coded; and generating said converted signal as an NRZI coded digital signal; and a decoding sequence further comprising the steps of: demodulating said NRZI-coded digital signal into a reconstituted digital signal; dividing said reconstituted digital signal into a series of reconstituted words, each with n bits of data and respectively corresponding to one of said n bit converted words; and converting only part of said bits of each of said reconstituted words to form a respective restored word with m bits, said restored word corresponding to an m bit base word that was converted into one of said converted words.

7. A method as in claim 6, wherein m is eight, n is ten and said converted signal has a maximum of four consecutive digital zeroes, and the first bit of each of said reconstituted words is ignored in converting each of said reconstituted words to form said respective restored word.

8. A converting apparatus for providing a digital signal having at least two signal levels, a DC component substantially equal to zero and a predetermined maximum time between level changes, said apparatus comprising: dividing means for dividing a base signal into a series of base words, each with m bits of data; memory means for converting said base digital signal into a converted digital signal by matching said base words with corresponding converted words, each of said converted words having n bits of data, wherein n is greater than m and said converted digital signal has a predetermined maximum number of consecutive digital zeroes, said converted words including a plurality of paired primary combinations of n bits having a DC component substantially equal to zero when NRZI-coded and a plurality of paired secondary combinations of n bits having a DC component with an absolute value of two when NRZI-coded, each pair of said primary combinations being comprised of two complementary combinations which differ in variance of DSV when NRZI-coded and which both correspond to a respective one of said base words, and each pair of said secondary combinations being comprised of two complementary combinations which differ in polarity of said DC component and which both correspond to a respective one of said base words; altering means for altering said variance of DSV of said primary combination when NRZI-coded and said polarity of the DC component of said secondary combination when NRZI-coded and thereby selecting the one of said pair of primary or secondary combinations corresponding to said base word which decreases said DSV of the converted digital signal when NRZI-coded; combining means for accepting said converted words from said memory means and providing said converted words in sequence to form said converted digital signal; and modulating means for providing said converted digital signal in an NRZI-code.

9. A converting apparatus as in claim 8, wherein said dividing means includes a first register for providing eight bits of the base digital signal to said memory means, said memory means provides a selected one of said primary combinations of ten bits having a DC component substantially equal to zero when NRZI-coded and of said secondary combinations of ten bits having a DC component of two when NRZI-coded in response to said eight bits of the base digital signal, said altering means includes detecting means for providing a control signal in response to a DSV at the exit of a preceding converted word of said converted digital signal and inverting means for inverting the first bit of data comprising the next converted word, and said combining means includes a second register.

10. A converting apparatus as in claim 9, wherein said inverting means includes an exclusive OR circuit for accepting said control signal and the first bit of the selected combination from said memory means for providing as the output of said exclusive OR circuit the first bit of data of said converted word to said second register.

11. An apparatus for encoding and decoding a digital signal having at least two signal levels, a DC component substantially equal to zero and a predetermined maximum time between level transistions, said apparatus comprising an encoding section which includes: dividing means for dividing a base signal into a series of base words, each with m bits of data; memory means for converting said base digital signal into a converted digital signal by matching said base words with corresponding converted words, each of said converted words having n bits of data, wherein n is greater than m and said converted digital signal has a predetermined maximum number of consecutive digital zeroes, said converted words including a plurality of paired primary combinations of n bits having a DC component substantially equal to zero when NRZI-coded and a plurality of paired secondary combinations of n bits having a DC component with an absolute value of two when NRZI-coded, each pair of said primary combinations being comprised of two complementary combinations which differ in variance of DSV when NRZI-coded and which both correspond to a respective one of said base words, and each pair of said secondary combinations being comprised of two complementary combinations which differ in polarity of said DC component and which both correspond to a respective one of said base words; altering means for altering said variance of DSV of said primary combination when NRZI-coded and said polarity of the DC component of said secondary combination when NRZI-coded and thereby selecting the one of said pair of primary or secondary combinations corresponding to said base word which decreases said DSV of the converted digital signal when NRZI-coded; combining means for accepting said converted words from said memory means and providing said converted words in sequence to form said converted digital signal; and modulating means for providing said converted digital signal in an NRZI-code; and further comprising a decoding section which includes: demodulating means for demodulating said NRZI-coded converted digital signal into a reconstituted digital signal; dividing means for dividing said reconstituted digital signal into a series of reconstituted words, each with n bits of data and respectively corresponding to one of said n-bit converted words; and converting means for converting only part of said bits of each of said reconstituted words to form a respective restored word of m bits, said restored word corresponding to an m-bit base word that was converted into one of said converted words.

12. An apparatus as in claim 11, wherein m is eight, n is ten and said converted signal has a maximum of four consecutive digital zeroes, and said converting means ignores the first bit of each of said reconstituted words in converting each of said reconstituted words to form said respective restored word.

* * * * *